United States Patent

Low et al.

[15] 3,701,894

[45] Oct. 31, 1972

[54] APPARATUS FOR DERIVING SYNCHRONIZING PULSES FROM PULSES IN A SINGLE CHANNEL PCM COMMUNICATIONS SYSTEM

[72] Inventors: George M. Low, Deputy Administrator of the National Aeronautics and Space Administration with respect to an invention of; Lucien A. Couvillon, Jr., 1891 Alpha Road, Glendale, Calif. 91208; Christopher Carl, 303 N. Oakland Avenue, Pasadena, Calif. 91101; Richard M. Goldstein, 5534 Rockcastle Drive, LaCanada, Calif. 91011; Edward C. Posner, 1460 Rose Villa; Richard R. Green, 252-D East California Street, both of Pasadena, Calif. 91106

[22] Filed: Sept. 11, 1970

[21] Appl. No.: 70,967

[52] U.S. Cl. ............235/181, 178/69.5, 235/150.53, 325/325, 340/146.1

[51] Int. Cl. ............................G06f 15/34, H041 7/08

[58] Field of Search ...178/69.5 R; 179/15 BS, 170.2; 325/325; 340/146.1 D; 235/181, 150.51, 150.52, 150.53, 156, 160

[56] References Cited

UNITED STATES PATENTS

| | | | |
|---|---|---|---|
| 3,575,554 | 4/1971 | Schmidt | 178/69.5 R |
| 3,553,722 | 1/1971 | Ott | 235/181 X |
| 3,514,585 | 5/1970 | Norsworthy | 235/181 |
| 3,444,360 | 5/1969 | Swan | 235/181 X |
| 3,388,241 | 6/1968 | Isaacs | 235/181 X |
| 3,309,508 | 3/1967 | Witt | 235/150.52 |
| 3,249,745 | 5/1966 | Burkhart | 235/160 |

FOREIGN PATENTS OR APPLICATIONS

| | | | |
|---|---|---|---|
| 1,473,006 | 2/1967 | France | 235/181 |
| 1,184,653 | 3/1970 | Great Britain | 235/181 |

*Primary Examiner*—Felix D. Gruber
*Attorney*—J. H. Warden, Paul F. McCaul and John R. Manning

[57] ABSTRACT

A method and apparatus is disclosed for bit synchronization of a received PCM communications signal, without requiring a separate synchronization channel in the communications signal by digital correlation of the received square-wave signal with a predetermined number of phase displaced replicas of its expected form. Each phase displaced replica is correlated with the input signal to determine which phase displaced replica produces the largest correlation signal. In carrying out the correlation of the square-wave signal with a given phased displaced replica, the two levels of the replica corresponding to the +1 and −1 binary values of the input signal are employed as sign signals to control the arithmetic addition or subtraction of the input signal binary values to the contents of an accumulator. The binary values of the input signal are produced by means for sampling and converting the input signal into +1 and −1 values. A plurality of samples of the input signal are thus accumulated during each cycle of a number of input signal cycles to develop a correlation value.

4 Claims, 20 Drawing Figures

LUCIEN A. COUVILLON, JR
CHRISTOPHER CARL
RICHARD M. GOLDSTEIN
EDWARD C. POSNER
RICHARD R. GREEN
*INVENTORS*

*BY* Paul F McCaul
J. H. Warden
ATTORNEYS

INITIAL step I UNSUCCESSFUL

INITIAL step I SUCCESSFUL step 7 - step 8

PATENTED OCT 31 1972 3,701,894

SHEET 06 OF 10

APPARATUS FOR DERIVING SYNCHRONIZING PULSES FROM PULSES IN A SINGLE CHANNEL PCM COMMUNICATIONS SYSTEM

ORIGIN OF THE INVENTION

The invention described herein was made in the performance of work under a NASA contract and is subject to the provisions of section 305 of the National Aeronautics and Space Act of 1958, Public Law 85–568 (72 Stat. 435; 42 USC 2457).

BACKGROUND OF THE INVENTION

This invention relates to apparatus for synchronizing a received pulse-code-modulated (PCM) communications signal, without requiring a separate synchronization channel, by digital correlation of the received signal with its expected form, first to acquire the subcarrier and then to synchronize with data bits, and further relates to a correlator for implementing the technique comprising an adder-subtracter and a shift register.

In a PCM communications system, it is necessary to synchronize data detection with the bits of data transmission. Accordingly, the receiver must include a subsystem which transforms the received signal and noise into a noise-free, clocked PCM bit stream.

The fundamental problem in a PCM communications system is to synchronize the transmitter and receiver, i.e., to provide the necessary timing to a synchronous "matched filter" in the receiver for optimum detection of data bits. In the past, this synchronization problem has sometimes been solved by the transmission of synchronizing information in parallel with the data.

Separate transmission of the synchronizing information requires that the transmitter power by diverted, i.e., the modulation power be shared between the data signal and the synchronizing signal. In order to maximize the power allocated to the data, methods of generating a synchronization signal from the data alone are required. Such methods have been successfully developed and widely used in ground equipment. These techniques vary widely in design, capability and performance.

A bit synchronization system used for ground telemetry demodulation during the Mariner Mars space flight in 1969 was implemented partially with hardware and partially with computer processing. The results achieved were within about 98 percent efficiency or 0.1dB of the theoretical performance of a perfectly synchronized matched filter. While such performance is highly desirable, the complexity required has put synchronizers for use aboard the spacecraft beyond consideration at the present time.

What is required for PCM communications in general, and in spacecraft particularly, is a simple technique for generating synchronization from transmitted data alone. While simple analog techniques may be readily designed which can be easily implemented, reliability and accuracy are lacking in analog components. The generally agreed advantage of digital components as regards to reliability, accuracy and flexibility may be achieved by substituting digital components for the analog components, but the result is not the most efficient as regard to use of space and electrical power because blindly replacing the analog components with digital components does not take advantage of the unique properties of the latter, especially the medium scale and large scale integrated circuit functional blocks which have recently become available in large production quantities.

OBJECTS AND SUMMARY OF THE INVENTION

An object of this invention is to provide apparatus for use in generating synchronization information from only the data signal received in a PCM communication system.

Another object is to provide a digital correlator which requires a minimum of space and electrical power without sacrificing advantages of reliability, accuracy and flexibility inherent in digital components.

In a PCM Communications System, a received signal consisting of a subcarrier modulated by data bits includes a prefix consisting of N bit times of unmodulated subcarrier followed by M bit times of "bit sync" code modulated subcarrier. Subcarrier synchronization is achieved in the first step by correlating the unmodulated subcarrier of the prefix with a predetermined number of different phases of a local reference signal. That phase of the reference signal producing the greatest correlation signal is then selected to generate locally a replica of the subcarrier. Bit synchronization is then achieved in the second step by correlating the "bit sync" code modulated subcarrier of the prefix with a predetermined number of equally spaced phases of the subcarrier synchronized, and locally generated, replica of the "bit sync" modulated subcarrier. The phase producing the greatest correlation signal is then selected for the phase of the locally generated "bit sync" code modulated signal as the bit synchronization signal used in data detection and bit tracking correlation.

In accordance with the present invention, all correlation is carried out with a digital correlator comprising an adder-subtracter and a shift register interconnected in the configuration of a accumulator. The reference signal for the correlation is provided as a square wave signal to control the addition or subtraction of new samples to an accumulated total in the shift register. One binary voltage level of the reference signal (sometimes referred to hereinafter as a replica) represents a plus one (+1) and the other voltage level represents a minus one (−1), or more simply the two binary voltage levels of the replica represents positive (+) and (−) signs. The samples are received by the adder-subtracter through an analog-to-digital converter. When the sign of the reference is positive, the sample is added, and when the sign of the reference is negative, the sample is subtracted, thereby approximating the following equation:

$$F = \int_0^T x x' dt \qquad (1)$$

where F is the desired function of the digital integrator, $x$ represents the samples in digital form and $x'$ represents the reference signal equal to ±1. Equation (1) can be written in the following form:

$$F = \int_{R+} +x dt + \int_{R-} -x dt \qquad (2)$$

where R+ is the region such that $x'>0$ and R− is the region such that $x'<0$. From Equation (2) it is evident that the reference signal $x'$ may be employed to control the function of the adder-subtracter to add new samples when $x'$ is positive and subtract new samples when $x'$ is negative.

In order that a single adder-subtracter suffice for correlating within different phases of the reference signal, the phases of the reference signal are selected in sequence. The accumulated totals for the predetermined number of different phase correlations are recirculated through the shift register in synchronism with the selection of the phases of the reference signal.

The novel features that are considered characteristic of this invention are set forth with particularity in the appended claims. The invention will best be understood from the following description when read in connection with the accompanying drawings.

DETAILED DESCRIPTION

In order to better understand the present invention relating to a method, apparatus and system organization for synchronizing a single-channel, pulse-code-modulated (PCM) communications signal, reference is first made to a prior art analog cross-correlator in a phase-lock loop used in space communications. Such an analog cross-correlator is shown in FIG. 1.

Figure 1:
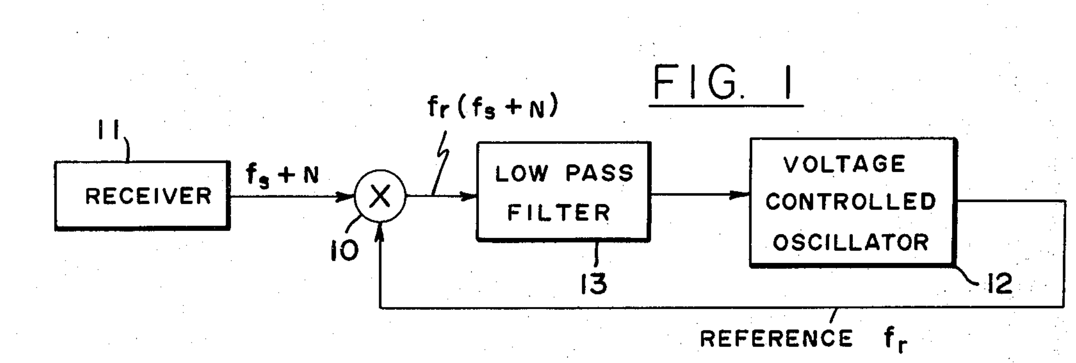
FIG. 1 is a block diagram of a conventional prior-art analog phase-lock loop for signal synchronization.

An analog circuit for cross-correlation develops a signal which is a measure of correspondence between two signals, one a communications signal being received, and the other a local reference signal generated by a voltage controlled oscillator, as shown in FIG. 1. A mixer 10 receives the communications signal ($f_s$) and noise (N) from a receiver 11, and produces the product of that signal ($f_s$+N) and a reference signal ($f_r$) from a voltage controlled oscillator 12.

A low pass filter 13 averages the product to produce an output signal that is a measure of the correlation between the input signal and the reference. A low pass filter is employed to integrate the output of the mixer 10 because a simple arrangement of resistors and capacitors is a convenient way of providing an RC time constant to determine the extent to which any past output signal from the mixer contributes to the present output signal to the voltage controlled oscillator. The filtered output signal controls the oscillator to adjust its frequency until it is in phase with the signal from the receiver, thereby synchronizing the reference signal with the received signal.

Rather than slowly varying the phase of the reference to find the maximum correlation, the phase could be incremented in discrete steps, for example in 16 steps, and a correlation performed for each of the 16 phases. The task then is to select the phase producing the largest correlation value from different correlation devices. The time required to find the phase producing the maximum correlation value is reduced considerably if all 16 correlations are performed in parallel. A comparator can be employed to select the largest correlation value. After a predetermined integration period, the comparator is interrogated to determine which reference phase produced the largest correlation value. That phase is then chosen as the synchronizing signal for the PCM detector. Although the short acquisition time of such a parallel arrangement is advantageous, the increased hardware and power requirements make such an analog implementation unsuitable for use in space vehicles. Analog components are less desirable for space flights for the further reason that they do not have the accuracy and reliability of digital components.

If the received signal is a binary waveform plus noise, as is the case for PCM communications, the reference signal is also a binary waveform and may be regarded as having an a value of + 1 at one binary level and − 1 at the other binary level. Accordingly, the combined analog functions of multiplication followed by integration may be carried out in accordance with the present invention by addition or subtraction of samples of the received signal according to the sign of the reference. Successive sums are then accumualted in a register to provide the integration function of Equation (2). In that manner, a register recirculating through the adder-subtracter functions as an accumulator to provide integration.

Figure 2:
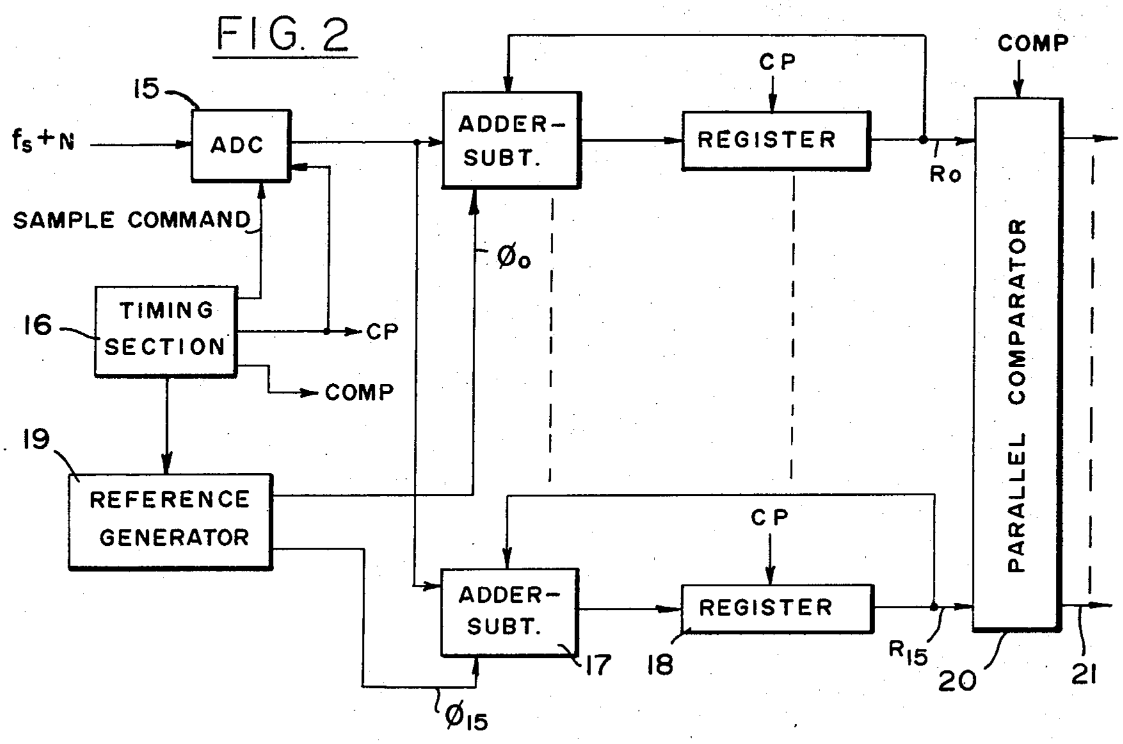
FIG. 2 is a block diagram for digital correlation of a received signal with each of a plurality of spaced phases of a reference signal in accordance with the present invention.

FIG. 2 illustrates a digital arrangement for performing sixteen correlations in parallel. The received signal ($f_s$+N) is applied to a single analog-to-digital converter 15 having a sample-and-hold stage at the input thereof for sampling and converting the input signal in response to sampling command signals from a timing section 16 at a rate 16 times the subcarrier frequency of the received signal $f_s$. In that manner the analog-to-digital converter 15 samples and converts the input signal into digital form, such as a 4-bit number, 16 times during one subcarrier cycle. It should be understood that the frequency of the subcarrier is typically in the audio region, such as 60 or 900 Hz, and is demodulated from a communications carrier in the mega cycle range by a standard PCM receiver.

An adder-subtracter connected to a given accumulator, such as an adder-subtracter 17 connected to an accumulator 18, receives one of 16 phase-displaced versions $O_0$ to $O_{15}$ of the binary reference signal $f_r$ from a reference generator 19 to cause the output from the analog-to-digital converter to be added or subtracted according to whether or not the sign of the phase displaced reference signal is positive or negative.

The phase-displaced replicas $O_0$ to $O_{15}$ of the reference signal $f_r$ are sequentially applied to the adder-subtracters by the generator 19 in synchronism with the sampling signals from the timing section 16. Referring to the channel for correlating the input signal with phase $0_{15}$ of the reference signal transmitted by the generator 19 to the adder-subtracter 17 as a plus sign (binary 0) when the phase $0_{15}$ signal is positive, and a negative sign (binary 1) when the phase $0_{15}$ signal is negative. The function of the adder-subtracter 17 is controlled directly by the sign of the phase $0_{15}$ signal. When that signal is positive, the operation carried out is addition of the output of the analog-to-digital converter to the output of the register 18; otherwise the operation carried out is subtraction. The sum, or difference, is then stored in the register.

The output of the adder-subtracter is stored in the register 18 in response to a clock pulse CP, after a predetermined delay period introduced by the timing section 16. The delay period is sufficient to allow the analog-to-digital converter 15 and adder-subtracter 17 to settle, but short enough for the new correlated value to be stored in the accumulator 18 before the next sample command signal occurs. The delayed clock pulse CP is also employed to reset the analog-to-digital converter so that it will be ready for a new sample upon the next occurrence of a sample command signal.

In order that each of the accumulators comprising an adder-subtracter and register effectively process an adequate representation of the input signal, the timing section 16 produces several sample commands for each cycle of the input waveform, such as 16 samples per subcarrier cycle. After a sufficient number of samples have been accumulated over a number of cycles of the received subcarrier signal, a control signal COMP enables a digital comparator 20 to determine which accumulator has the largest cross correlation value and to produce an output signal at a terminal corresponding to that accumulator. For example, if the accumulator 18 is storing the largest correlation value, an output signal is produced at only its associated output terminal 21. The recirculation or feedback from the accumulator 18 to the adder-subtracter is an integral part of correlation, as will be better understood from the following description. Briefly, each sample from the analog-to-digital converter 15 is a binary +1 or −1 value arithmetically added or subtracted from the content of the accumulator according to the sign (voltage level) of the phase displace reference signal (replica) applied to the adder-subtracter. If the sign of the replica is positive, the sample is added, which means adding a binary one when the sample is a plus one and subtracting a binary one when the sample is a negative one. If the sign of the reference is negative, the sample is subtracted, which means subtracting a binary one when the sample is a plus one and adding a binary one when the sample is a negative one. The result is effectively accumulation of the products sample of both the input signal and the phase displaced replica.

Figure 3:
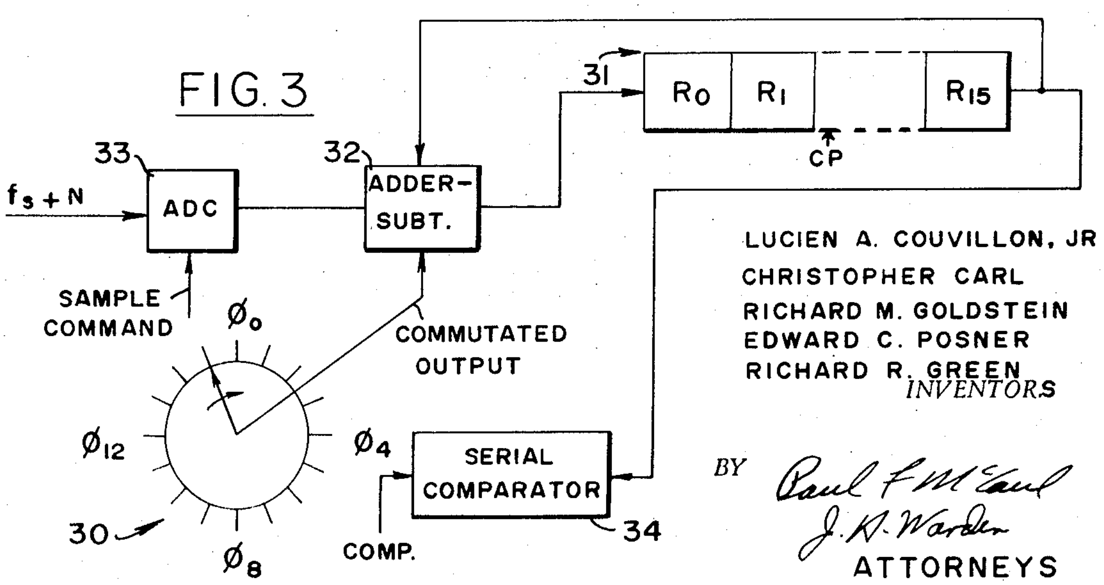
FIG. 3 is a block diagram for a digital correlator in accordance with a preferred embodiment of the present invention.

While the digital correlator of FIG. 2 has the accuracy and reliability inherent in digital components, 16 separate correlation channels obviously require too many components for some applications, especially for space flights and explorations. If the 16 accumulators are organized as a single bank of shift registers in series, one shift register for each accumulated value, a single adder-subtracter may be employed by applying all sample command signals in sequence to the single analog-to-digital converter and commutating the phases $0_0$ to $0_{15}$ of the reference signal $f_r$ to the single adder-subtracter as shown in FIG. 3. A commutator 30 and the sixteen correlation values in the bank of registers 31 circulate once per sample command.

Figure 4:
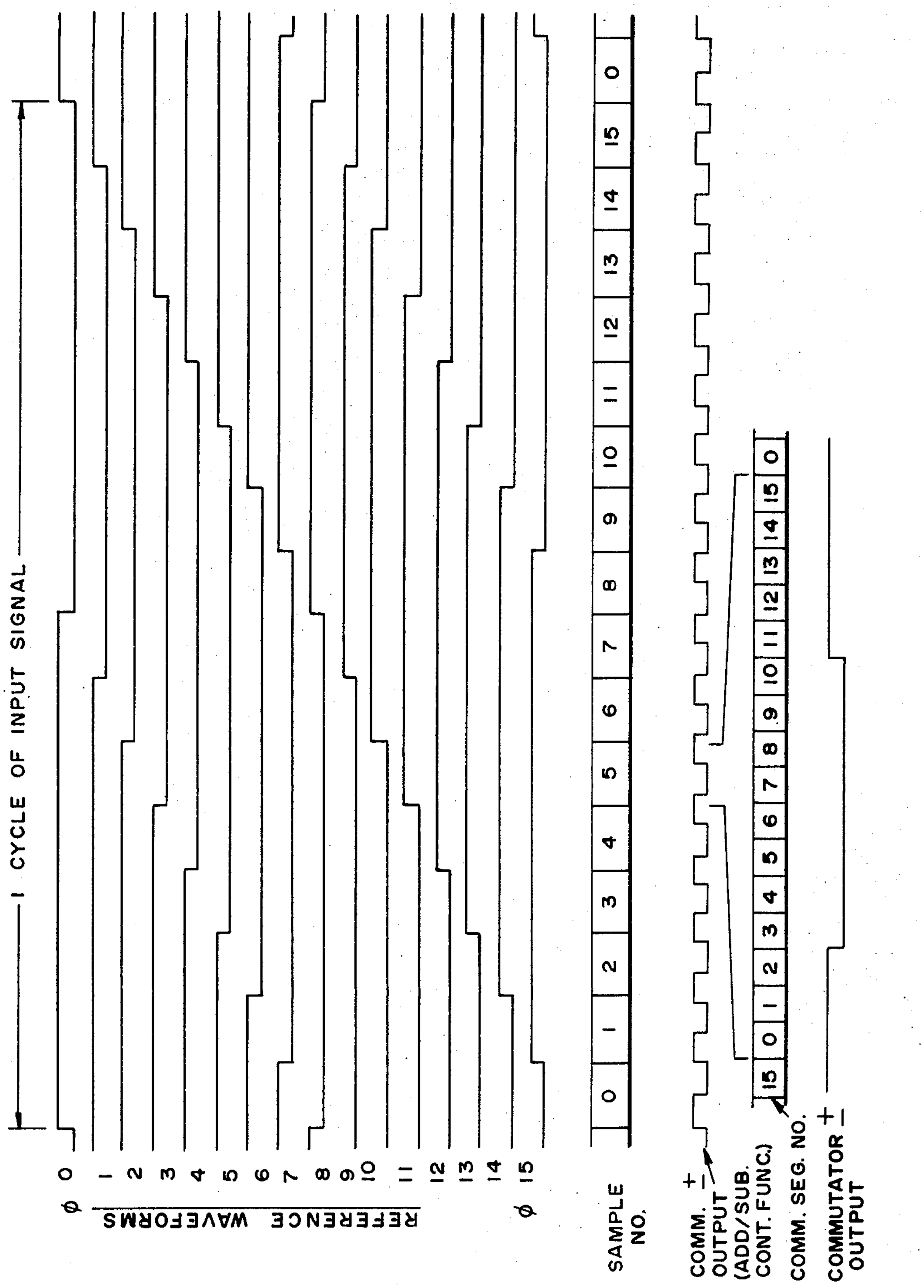
FIG. 4 is a waveform diagram of equally spaced phases of a subcarrier reference signal and a synthesized add/subtract control signal.

Phase displaced reference waveforms, and the commutator output for the case of 16 samples per cycle of an input signal, are shown in FIG. 4. The commutator output for the fifth sampling sequence is illustrated by the last waveform. It should be understood that the commutator 30 is shown for explanation only; in practice, a reference waveform generator is used which is functionally equivalent to the commutator.

Assuming a sixteen bit output from an adder-subtracter 32 for a 4-bit output from an analog-to-digital converter 33, a number of shift registers equal to the number of phases being correlated would be required for the bank of shift registers 31, each having 16 stages. A serial comparator 34 would then receive the correlation values in sequence, each consisting of sixteen bits, for the purpose of determining which correlation value is the largest, all in response to a control signal COMP.

To implement the accumulator with one shift register having 256 stages for sixteen correlation values in series, a 4-bit shift register could be employed at the output of the analog-to-digital converter 33 to convert the 4-bit parallel output into serial from. The adder-subtracter 32 would then be implemented as a serial adder-subtracter, and the clock pulses (CP) applied to the bank 31 of shift registers would then be multiplied by a factor of 16 to produce clock pulses at a frequency of 4096 times the frequency of the input signal ($f_s$). That will cause sixteen complete shift register recirculations to occur for each sample sequence. A timing section is employed to generate the clock pulses and time the generator of the reference signal (commutated output).

Evidently, the number of components required to implement a digital correlator using either a serial or a parallel adder-subtracter is minimal. The accumulator would, in either case, consist of 256 binary stages provided as a medium scale integrated circuit packaged in a container normally used for a single small transistor. Such medium scale integrated circuits are commercially available at very modest prices.

Another major advantage of a digital correlator over an analog correlator is the ease with which the bit rate of the PCM communications can be changed. To change the bit rate in an analog correlator requires the change of many time constants and filter parameters. In a digital correlator, only one input (low pass) filter is required and the master clock frequency may be easily changed. The input filter is not shown in FIGS. 2 and 3, but is understood to be present to filter the input to the analog-to-digital converter with a cutoff frequency equal to or less than the Nyquist frequency of eight times the subcarrier signal frequency $f_s$.

In the digital correlators of FIGS. 2 and 3, the number of samples taken of each input cycle may be increased (while leaving the number of reference phases the same) by merely driving the analog-to-digital converter at a faster rate. In the embodiment of FIG. 3, the commutator 30 must also be driven at a correspondingly faster rate. For example, if the sampling rate is to be doubled, then the rates of both the commutator and the sampling command generator are doubled.

Referring to the commutator output waveform of FIG. 4, if the sampling rate is doubled, then the portion of the waveform shown for each of the sample sequence will be repeated twice in the same time period of one cycle of the input signal. For example, that portion of the waveform shown for sample number 5 will be repeated twice in the time shown for that sample such that the commutated output is driven through segments 0 to 15 twice; if the sample rate is increased by a factor sixteen over the original rate, then each portion of the waveform will be repeated sixteen times, and each portion will occupy the same amount of time as that shown for one commutator segment. As will be seen, an analogous technique is used for implementation of the synchronizing technique to be described with reference to FIGS. 7, 8 and 9.

The fundamental algorithm of the technique for digital correlation and synchronization is to correlate the receiver output ($f_s$+N) with a reference signal for a time $T_c$; if the largest correlation exceeds a threshold, indicating the presence of the PCM communications signal, the phase of the reference is adjusted to correspond to the phase of the correlation peak. This process of correlation is done at least two times; once to establish subcarrier synchronism, and once to establish bit synchronism. However, it may be accomplished three times such as to first establish subcarrier synchronism, next to establish symbol synchronism where the symbol synchronism is with a pseudonoise (PN) code modulated subcarrier, but with the rate of the PN code equal to a number of subcarrier cycles, such as 15, and then to establish bit synchronism with the subcarrier modulated with the PN code at a rate of one PN bit per subcarrier cycle.

While subcarrier and bit synchronism correlations could be done simultaneously, it is preferred to do them in sequence in order to use the same components for both correlations by simply controlling the rate at which the reference commutator and sampling signal generator are driven. Considering only the two step technique for subcarrier and bit synchronism, and assuming 15 subcarrier cycles per data bit, the minimum correlation time $T_c$ is set equal to five data bit times to make threshold tests reliable. Therefore, the minimum time required for subcarrier and bit correlation in sequence is 10 bit times. However, as will be seen, a minimum of 15 bit times is allowed for each of the subcarrier and bit correlations.

Figure 5A:
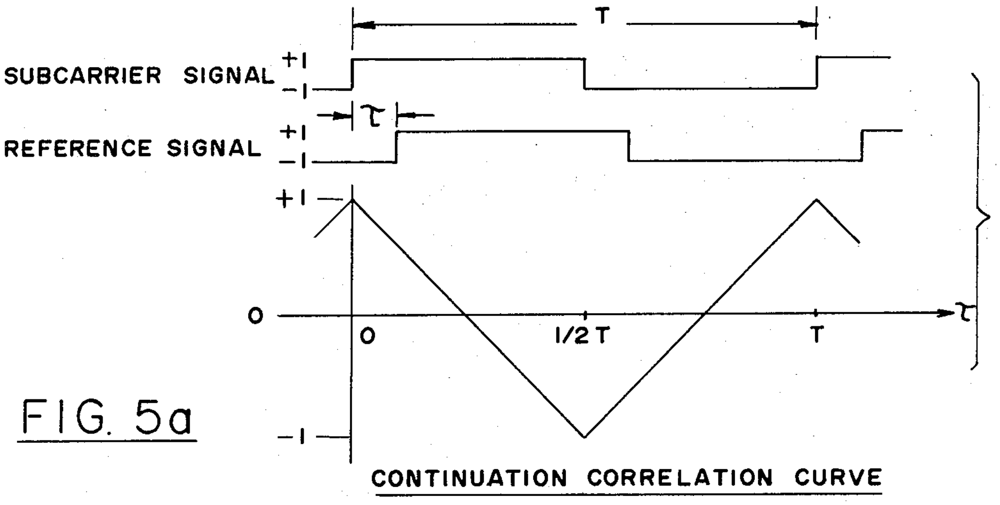
FIGS. 5*a* and 5*b* illustrate continuous and discrete correlation properties of a subcarrier signal.
Figure 5B:
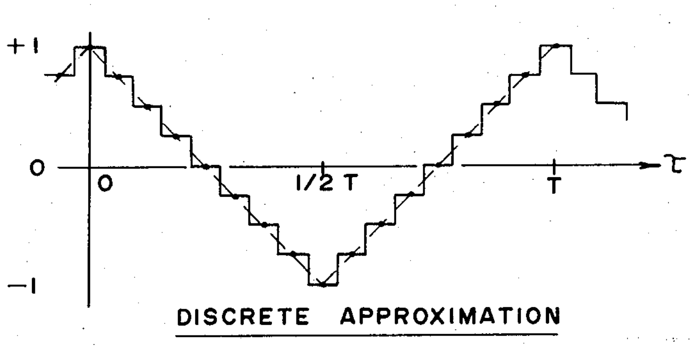

During subcarrier correlation, the digital correlator locates a peak point on the correlation curve shown in FIG. 5a. Since the data are sampled, only the 16 points shown in FIG. 5b are actually computated by the digital correlator, and the correlation curve seen by the system is the staircase function of FIG. 5b. To produce the 16 correlation points, the input waveform is sampled 16 times per subcarrier cycle, and correlated with 16 reference phases $\mathbf{0}_0$ to $\mathbf{0}_{15}$ displaced with respect to each other by increments of one sample period. In other words the 16 reference phases are equally spaced phases of the reference signal $f_r$ and of the same frequency as the subcarrier frequency. From FIG. 5b it is evident that in this sampled-signal correlation technique, the phase correlation is limited to ±½ of a sample period.

Figure 6:
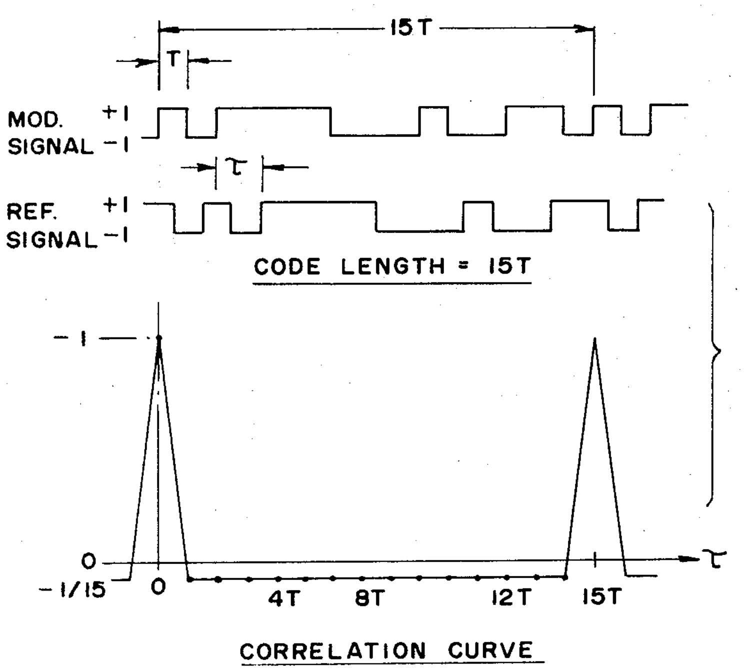
FIG. 6 illustrates correlation properties of a PN code modulated subcarrier signal.

During bit correlation, the digital correlator attempts to locate the peak points of a correlation curve while a code modulated signal is being received. The code can be any constant pattern of binary digits, referred to hereinbefore as a "bit sync" code such as a simple two bit code of 01, a Barker code, or a pseudonoise (PN) code, having a period equal to a data bit. In this illustrative example, the code selected is a PN code 15 bits long. A correlation curve for the PN modulated subcarrier is shown in FIG. 6. Only 15 discrete points are actually computed one for each of 15 equally spaced phases of the PN modulated reference.

The PN code modulates the subcarrier at a rate of one PN bit per subcarrier cycle, and the duration of a data bit is defined to be 15 subcarrier cycles. After acquiring subcarrier synchronism, the system computes bit correlation values by correlating the PN modulated subcarrier received with 15 phases of the PN code modulated reference spaced one subcarrier cycle apart. Bit synchronism is then achieved by adjusting the phase of the PN code which produces the peak value of the curve shown in FIG. 6.

Figure 7:
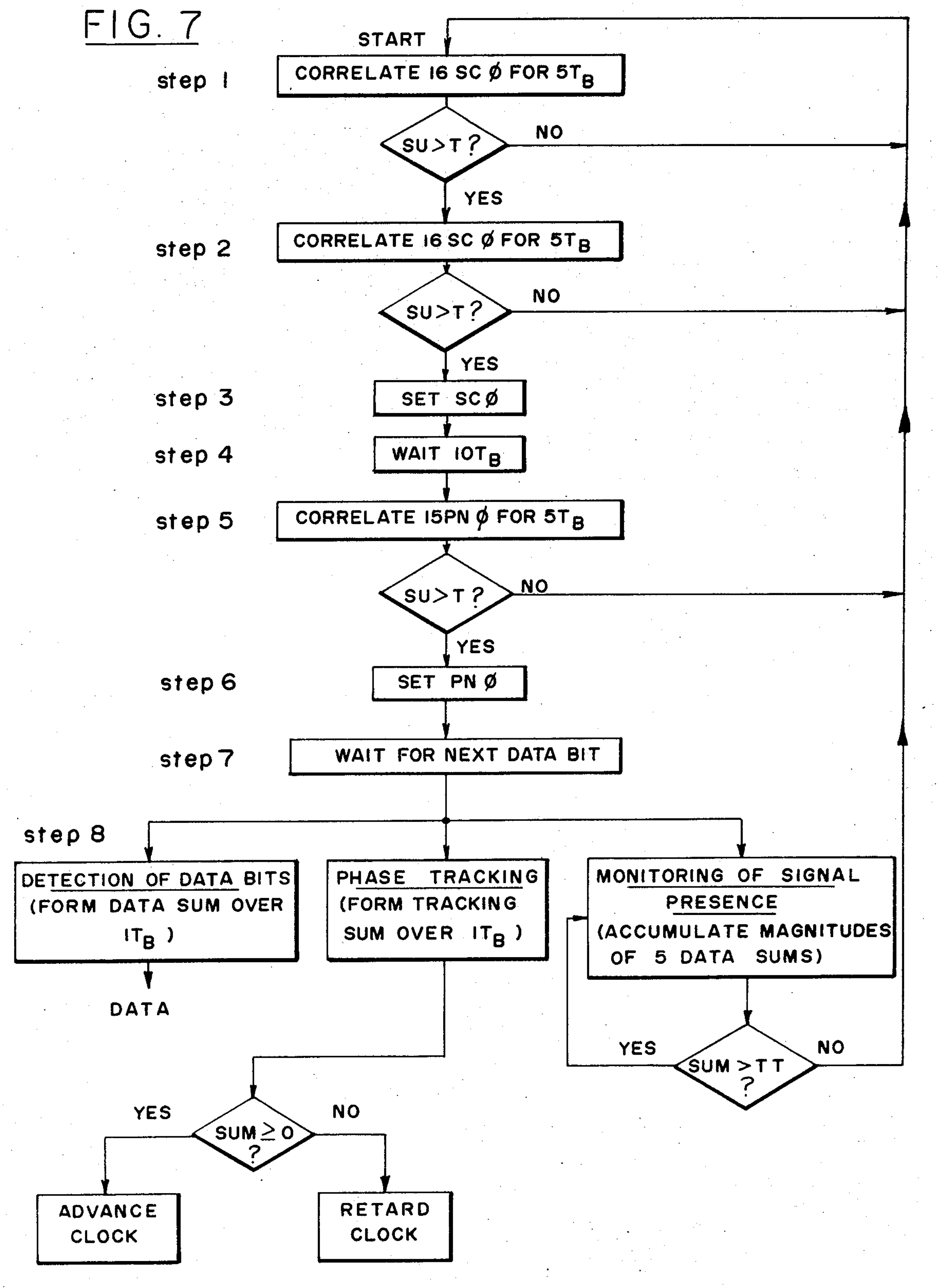
FIG. 7 is a flow diagram for a method of synchronizing a PCM signal from an unattended receiver in accordance with the present invention.

As noted hereinbefore, these subcarrier and bit correlations are formed in sequence in accordance with the preferred embodiment of the present invention, as shown by the basic flow diagram of FIG. 7. During the first step, the system simultaneously correlates sixteen phases of the subcarrier reference with the incoming signal for five data bit times ($5T_B$). If at the end of this time the largest correlation value exceeds a preset threshold, the system advances to the second step. If the threshold is not exceeded, the first step is continued, i.e., the subcarrier correlation process is continued.

In the second step, the correlation against the subcarrier reference phases is repeated for reasons which will become apparent from the description to follow, and the threshold is again checked. If the threshold is again exceeded, step 3 is initiated.

In step 3, the reference phase having the largest correlation value in step 2 is selected as the best subcarrier phase estimate. The locally generated reference signal is then advanced to the indicated phase and locked. Once that is accomplished, step 4 is initiated. That step consists of merely waiting 10 bit periods for reasons to be described hereinafter. Once that waiting period has expired, step 5 is automatically initiated.

In step 5, bit correlations with fifteen phases of the PN modulated subcarrier reference are correlated with the PN modulated incoming signals for five data bit periods. The signal PN code is synchronous in a preset way with data bits of the PCM communications message to follow. Thus, once threshold is again exceeded, bit synchronism is achieved by adjusting the PN code modulated subcarrier reference to that phase which has the largest correlation value. That is done in step 6 to provide a locally generated and synchronized PN code modulated subcarrier reference for data detection by correlation of the data and PN modulated subcarrier signal thereafter received. However, other data detection techniques can be used, and the synchronized PN code modulated subcarrier reference can be used to generate data bit synchronizing pulses for processing the detected data.

Once bit synchronism is thus established, step 7 is initiated. That step consists of waiting for the start of the next data bit period. Following that, step 8 is initiated.

All synchronization is complete when step 8 is initiated for the PCM communications system to begin detection of data bits by correlation of the input signal with the synchronized reference signal. A "word-start" code may precede the actual message. For purposes of understanding the present invention, it is sufficient to know that such a "word-start" code consists of a predetermined pattern of bits which are recognized in the data communications system downstream from the digital correlator.

Detection of data bits by correlation is accomplished simply by performing the same digital correlations described with reference to FIGS. 2 and 3. However, only the in-phase correlation is of concern. This in-phase correlation is an approximation to the output of a matched filter, which is known to be the optimum detector.

In step 8, two other functions are performed in addition to data detection. One is the monitoring of signal presence. The monitor forms the sum of the magnitudes of five data bit correlations and compares this sum to a threshold. If the threshold is not exceeded, the system returns to the first step. This is desirable in order to detect the end of a transmission and prepare for receiving a subsequent transmission.

The other function performed in step 8 is phase (or frequency) tracking. This is desirable to compensate for small frequency offsets due to doppler shifts and oscillator instabilities. Tracking is accomplished by forming a sum of samples taken across the known transition (zero crossover) of the correlation function. The sum is compared to zero at the end of one bit time of accumulation, and the sign of the sum determines the direction the phase of the clock must be shifted. The clock phase is shifted a fixed discrete amount in either direction.

Although step 8 has been included in the flow diagram of FIG. 7 to provide a description of the operation of complete PCM communications system embodying the present invention, it should be appreciated that the present invention is embodied in the first six steps.

Figure 8:
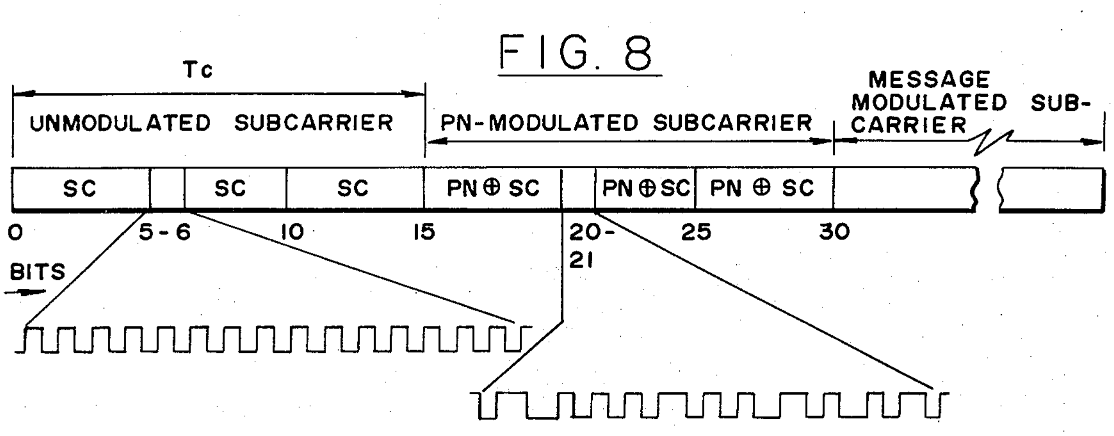
FIG. 8 is a diagram of a PCM signal prefix used in the method of FIG. 7.
Figure 9A:
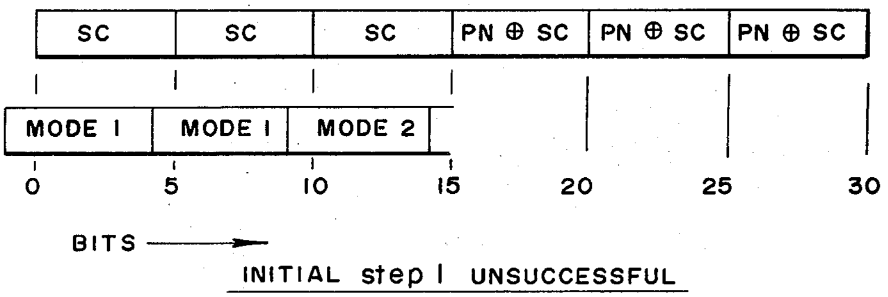
FIGS. 9*a*, 9*b* and 9*c* illustrate timing diagrams for the prefix of FIG. 8 for different conditions.
Figure 9B:
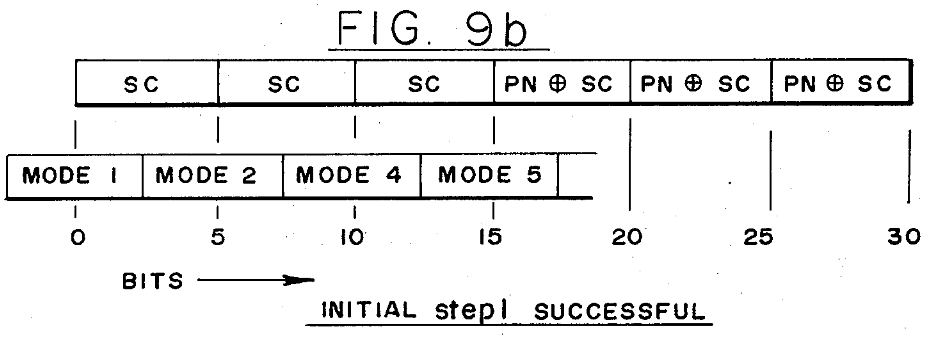

The technique thus far described with reference to FIG. 7 cannot succeed unless the proper signal component is present during each of the correlation steps 1, 2 and 5. Specifically, during steps 1 and 2 unmodulated subcarrier must be present, and during step 5 subcarrier modulated by the PN code must be present. To meet these requirements, the prefix shown in FIG. 8 is sent before each message. The signal format is bi-phase modulation of a carrier with a binary (square-wave) subcarrier. One data bit period consists of 15 subcarrier cycles for any given bit rate, and the PN code used for bit synchronization is 15 bits long.

In designing this prefix signal, worst-case conditions must be the prime consideration. When the communications system is initially in step 1, it has no synchronizing information and may begin to correlate at any arbitrary time with respect to the transmitted unmodulated subcarrier prefix. Consequently, there may be correlation during step 1 for which the prefix is only partially present. If this first correlation does not exceed the threshold, step 1 must be repeated, and a situation such as that shown in FIGS. **9*a* and 9*b* will exist. To allow for successful completion of steps 1 and 2 in this case, 10 more bit times of unmodulated subcarrier will be required after the successful step 1 correlation is completed. As a conservative worst-case design, it may be assumed that the prefix is present during all of the unsuccessful correlation. This would require a total of 15 bit times of unmodulated subcarrier if both steps 1 and 2** are to be completed. Consequently, 15 bit times of unmodulated subcarrier are allowed for the prefix.

The converse situation occurs if the step 1 correlation is successful even though the prefix is only partially present. This condition is shown in FIG. **9*b*. In such a case, steps 1 and 2 have more than ample time for completion, but the timing of the PN correlation in step 5 becomes critical. If the step 1 correlation were to be completed very early in the prefix period, it may be possible for the system to enter step 5 before the PN code modulated portion of the prefix arrives. This situation is prevented by step 4 which introduces a 10-bit waiting period. As a very conservative worst-case design, it may be assumed that the step 1 correlation is completed at the very beginning of the prefix. In this case the required waiting period would have to be 10 bits, which is the time allotted to step 4**.

FIG. **9*b* also points out the reason for existence of step 2; if step 1 correlations were to be successful with only partial presence of the prefix, the resulting correlation values would likely be very bad estimates of the subcarrier phase. The existence of step 2** guarantees that the prefix will be present over the entire phase determining correlation period.

Figure 9C:
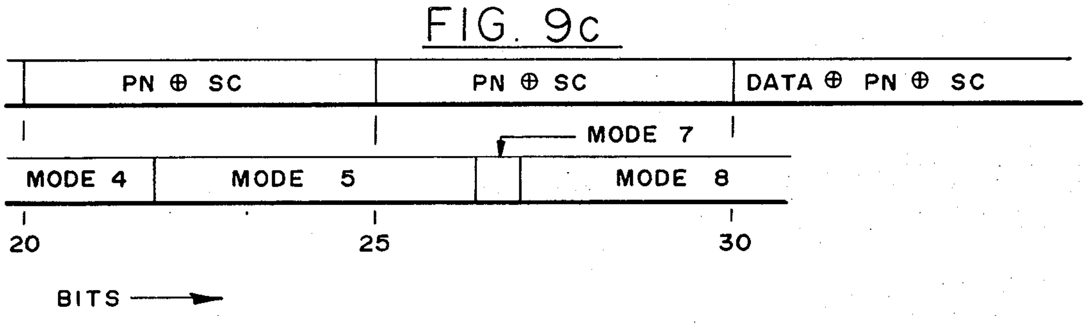

Referring again to FIG. 9a, it may be seen that if worst-case conditions were to prevail in that situation, the 10-bit waiting period of step 4 will consume 10 bits of PN modulated subcarrier. In such a case, 15 bits of the PN modulated subcarrier would be needed to successfully complete step 5. To allow for this eventuality 15 bit times of the prefix are allotted to PN modulated subcarrier. Thus, with the prefix signal as shown diagramatically in FIG. 8 the correlation system should be able to successfully acquire subcarrier and bit synchronism. However, it should be noted that step 5, including the small amount of time allotted for step 6, which like step 3 is not shown in FIG. 9*a* because it consumes a negligible amount of time, may be completed at any point during an actual transmitted data bit period since the initial phase offset is random. Even though synchronism has been established, it would be necessary for the correlation system to wait until the start of the next bit period before it begins to detect data. This is the purpose of step 7 as shown in FIG. 9*c*. After step 7, the system is ready to detect data in step 8.

Upon entering step 8, unused bits of PN modulated subcarrier may remain, as shown in FIG. 9*c*. In order to avoid an additional waiting period before entering step 8, it is desirable to encode the binary data by modulating the subcarrier with not only the data bits but also the PN bits. In this way the correlation system may enter step 8 immediately, and unused bit times of the PN prefix will be decoded as a string of data bit zeros preceding the actual message. An alternative would be to have the PN code modulated with a word-start code. When that code is detected, the system would then be switched to a detection of data bits modulated on the subcarrier without the PN code or any other "bit sync" code. As noted hereinbefore, the function of detecting the word-start code would be better left to the PCM communications decoder, and synchronized data detection would be better accomplished by correlation of the PN code and data modulated subcarrier received with a PN code modulated subcarrier reference.

Figure 10A:
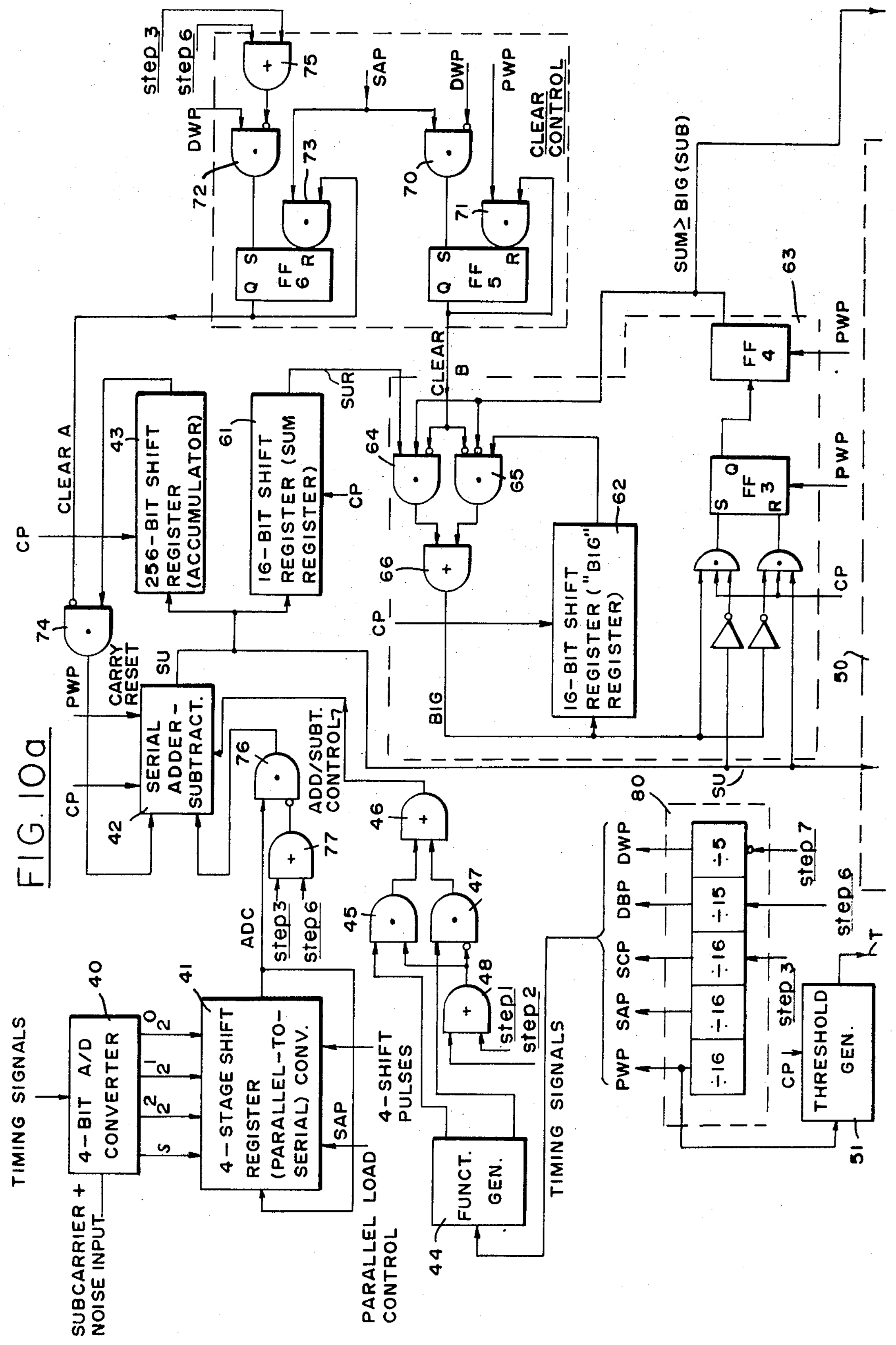
FIGS. 10*a* and 10*b* together show a block diagram of an illustrative system for carrying out the method of FIG. 7. For convenience the composite of FIGS. 10*a* and 10*b* will sometimes be referred to as FIG. 10.

All of the correlation functions of the flow chart illustrated in FIG. 7 may be performed by the basic digital correlators of FIGS. 2 and 3 along with some straight forward timing and control logic. However, the implementation chosen for the digital correlator in a preferred embodiment employs a single shift register having 256 stages, as shown in FIG. 10*a*, instead of a bank of 16 shift registers, each having 16 stages. Thus the digital correlator consists of a 4-bit analog-to-digital converter 40, a four stage recirculating shift register 41 to repeatedly convert each parallel output of the converter 40 into serial form, a serial adder-subtracter 42 and a 256-bit shift register 43 which recirculates through the serial adder-subtracter 42.

The reference phase commutator 30 of the digital correlator illustrated in FIG. 3 is provided by a function generator 44. During steps 1 and 2, the function generator 44 produces the commutator output waveform shown in FIG. 4. That waveform is transmitted through an enabled AND gate 45 and an OR gate 46 to the adder-subtracter 42. In all other steps, correlation is against the subcarrier modulated by a 15-bit PN code. Therefore, the output waveform of the function generator 44 is the commutated output of 16 phase displaced reference wave form PN code modulated. That PN code reference waveform is transmitted through an AND gate 46. An inhibit terminal of the AND gate 47 is connected to the output terminal of an OR gate 48 which receives step 1 and step 2 control signals so that only the subcarrier reference waveform is transmitted to the AND gate 45 during the first two steps, and the PN code reference waveform is transmitted through the AND gate 47 at all other times. This use of control AND gates 45 and 47 permits a simplified design of the function generator, since the function generator may then continually generate both the subcarrier waveform and the PN code waveform where the subcarrier reference waveform is as shown for the "commutator" output in FIG. 4, and the PN code reference waveform is synchronized with the subcarrier reference waveform.

Figure 11:
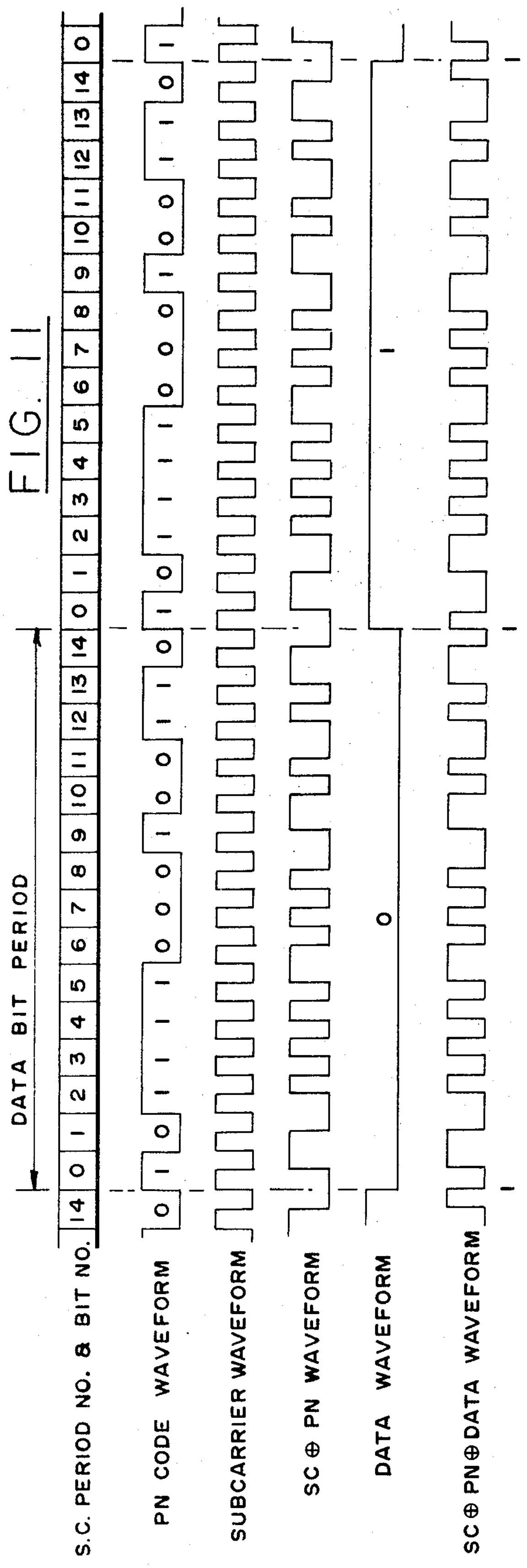
FIG. 11 is a waveform diagram illustrating the composition of a PN code modulated subcarrier modulated with data.

A reference to FIG. 11, which illustrates the composition of a received signal, will assist in understanding the composition of the reference waveforms gated to the adder-subtracter 42 during steps 1, 2 and 5. As noted hereinbefore, a data bit period is 15 cycles of the subcarrier waveform shown. The PN code waveform selected is as shown in the second waveform. Accordingly, the PN code portion of a signal prefix is a waveform produced by forming the exclusive-OR of the subcarrier (SC) and the code (PN), as shown by the SC⊕PN waveform. Following the PN code portion of the prefix, the SC⊕PN waveform is modulated by a data waveform by forming the exclusive-OR of the SC⊕PN waveform and the data waveform to produce the SC⊕PN⊕DATA waveform shown.

Figure 12:
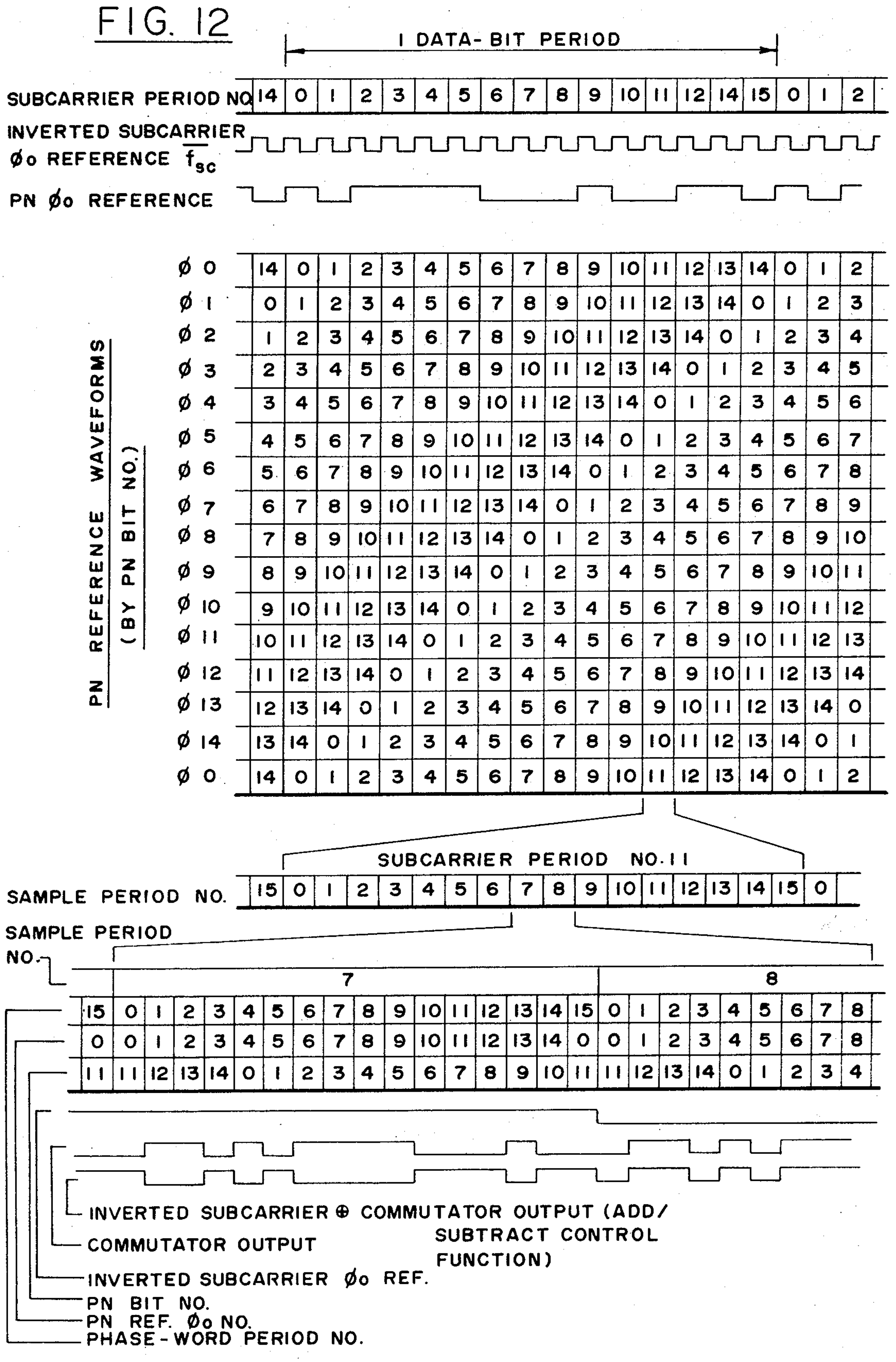
FIG. 12 is a diagram of equally spaced phases of a PN code modulated subcarrier reference signal and a synthesized add/subtract control signal.

The synthesized subcarrier reference (add-subtract control signal) produced by the function generator 44 is then like a "commutated" subcarrier as shown in FIG. 4 to simulate 16 successive samples of equally spaced phases of the locally generated subcarrier reference. The PN code reference (add-subtract control signal) is similarly produced by the function generator. A diagram showing the development of a synthesized PN code reference is shown in FIG. 12. The diagram is similar in format to the diagram of FIG. 4 for the development of the synthesized subcarrier reference except that the 16 equally spaced phases of the PN code modulated subcarrier are described by PN bit numbers, rather than by waveforms.

To understand the diagram of FIG. 12, assume that a commutator is employed to sample each phase during each sample period. However, it should be noted that there are only 15 bits in the PN code and therefore only 15 PN code reference phases. To provide 16 phase samples during a sample period in order to use the same system organization for step 5 as for steps 1 and 2 where 16 phases of the reference are effectively provided, the first phase $\mathbf{0}_0$ is sampled twice.

As noted hereinbefore, the "commutation" rate is not restricted to one rotary cycle per sample period. However, in the preferred embodiment, the commutation rate is selected to be one rotary cycle per sample period for step 5 as well as steps 1 and 2. Accordingly, the PN code reference repeats sixteen times per subcarrier period to stimulate a commutator scanning all 15 phases 16 times. This means that each of the 16 sample periods in a subcarrier cycle are employed to update each of the 16 PN code phase correlation values in the shift register 43.

Referring again to FIG. 10, at the end of each of the steps 1 and 2, the largest phase correlation value is compared with a threshold value to determine whether the largest correlation value is bigger than a threshold value T. If not, the correlation is repeated, as noted hereinbefore. Thus, for the transition to be made from step 1 to step 2 and from step 2 to step 3, the accumulated value of one of the sixteen phase correlations must be larger than the selected threshold value. This comparison is performed by a threshold detector 50 shown in FIG. 10*a* which performs a serial comparison between each phase correlation value out of the adder-subtracter 42 and the threshold value from a generator 51.

It should be noted that the threshold detector 50 operates throughout the step 1 and step 2 periods. However, only the results of the comparison made during the final (1,200th) sample period of each of the steps is issued.

A comparator flip-flop $FF_1$ is reset at the start of each phase word period by a PWP pulse, as shown in FIG. 106, and then, operating serially, compares the two 16 bit words (T and SU) from the threshold generator and adder-subtracter. Comparison is done serially starting with the least significant bit. The flip-flop $FF_1$ can change state only if an inequality exists between corresponding bits of the two numbers being compared. At any $FF_1$ in time, if the SU bit is a binary 1 while the T bit is a binary 0, the number SU is deemed to be larger than the number T until such time as the T bit is a binary 1 while the corresponding SU bit is a binary 0 to reset the flip-flop $FF_1$. At the end of the word period a PWP pulse copies the state of the flip-flop $FF_1$ into a storage flip-flop $FF_2$ and resets the flip-flop $FF_1$. Accordingly, the output of the flip-flop $FF_1$ will be true only if a most recent (most significant) bit 1 of the number SU is compared with a binary 0 of the corresponding number T, and all subsequent bits of the two numbers were equal, in which case the number SU is considered to be larger than the threshold value T. System clock pulses (CP) are applied to AND gates 51 and 52 to strobe the numbers SU and T while complements of the SU and T digits are applied to the AND gates 52 and 51 through inverters 53 and 54, respectively.

Negative numbers at the output of the adder-subtracter are in 2 's complement form. Since the comparator is capable of comparing only the magnitude of positive numbers, negative SU numbers are rejected by an AND gate 55. If the final bit of the 16-bit SU number is a binary 1, (designating a negative number), the gate 55 will be inhibited, and the output of a delay device 56 will be a zero at the time it is strobed by a PWP pulse at the input to the storage flip-flop $FF_1$ or a data subword period pulse (DWP) in a sequence control unit 57, which is shown in FIG. **10*b***.

Figure 13:
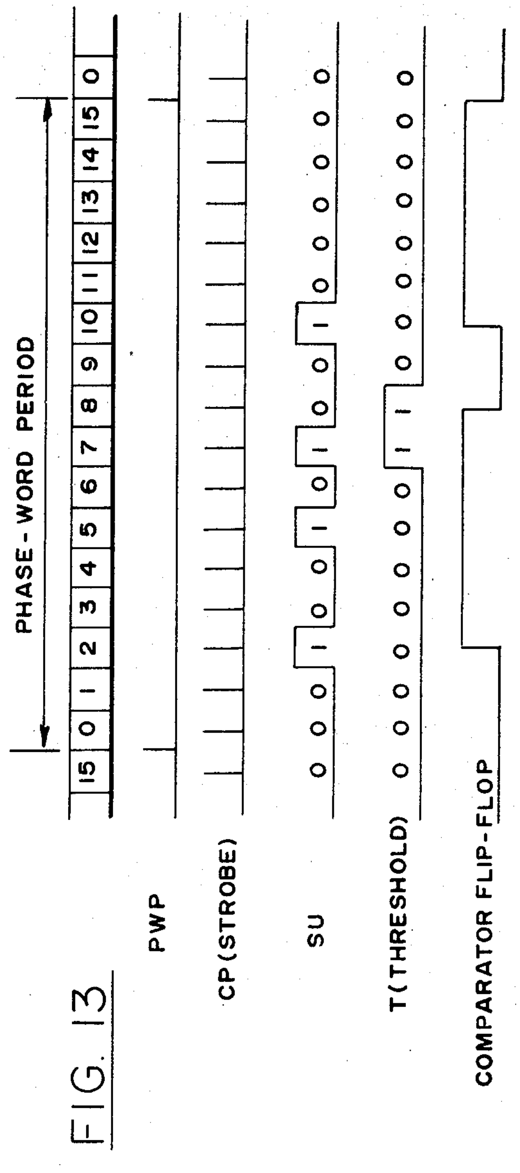
FIG. 13 is a timing diagram illustrating the operation of a digital threshold detector.

FIG. 13 is a timing diagram illustrating the operation of the threshold detector. As noted hereinbefore, the PWP pulse is a phase word timing pulse. As illustrated, the SU number contains a binary 1 in the 10th clock period while the corresponding digit of the threshold number T is a binary 0. Accordingly, the flip-flop $FF_1$ is set by the clock pulse and remains set until the next PWP pulse because a binary 1 does not occur thereafter in the threshold value T for comparison with a binary 0 in the correlation value SU.

It should be noted that the threshold detector looks at each of 16 phase correlation values in a sample period. If more than one phase correlation value is greater than the threshold value, then the first to occur will cause a storage flip-flop $FF_1$ to be set in response to a PWP pulse. This flip-flop is thereafter not reset until a timing pulse SAP indicates the end of a sampling period. The first correlation value compared may not be the largest of all sixteen phase correlation values, but the flip-flop $FF_2$ may be allowed to be set by the first phase correlation value which exceeds the threshold value.

Once the storage flip-flop $FF_2$ has been set, a DWP pulse which times a data subword period will advance the sequence control unit 57 from step 1 to step 2 or from step 2 to step 3 if subcarrier correlation is being carried out, and from step 5 to step 6 if bit correlation is being carried out.

It may be that only the 16th phase correlation value exceeds the threshold value. If so, the storage flip-flop $FF_2$ will not be set in time for the start of the new data subword period marked by a pulse PWP. Therefore, the pulse output of the delay device 56 is transmitted through an OR gate 58 directly to the sequence control unit 57 to permit a DWP pulse to advance the system from the current step to the next step. If an earlier correlation value exceeds the threshold value, the flip-flop $FF_2$ effectively stores the pulse output of the delay device 56 until the DWP pulse occurs.

The storage flip-flop $FF_2$ is reset at the start of each sample period, i.e., each period of correlation with 16 phases, by the sample period pulse SAP, as noted hereinbefore. This is necessary because the input signal contains noise, and at some point in the correlation process, a phase correlation value could exceed the threshold value T even though at the end of the last, or 1,200th summation, it has dropped below the threshold value T. Resetting the flip-flop $FF_2$ causes the state of the SUTH signal from the OR gate 58 to be based on the final summation value at the time the DWP pulse is applied to the control unit 57.

The threshold generator 51 is synchronized with the PWP pulses and may consist of a shift register storing the threshold value T in binary form. Each PWP pulse will store the threshold value T in parallel from a fixed source. Thereafter, clock pulses (CP) will shift the threshold value T into the serial comparator 50 as shown by the timing diagram of FIG. 13. However, it should be noted that this implementation of the threshold generator 51 is described only by way of example, and not by way of limitation.

The operation of locating the largest phase correlation value during a data sub-word period is performed by two 16-bit shift registers 61 and 62. The second shift register 62 stores the largest value BIG, which is constantly being compared to the latest phase correlation value through a serial comparator 63 similar to the threshold comparator 50. If a current phase correlation value SU is greater than the value BIG, a flip-flop $FF_3$ is set, and at the end of the phase word period, a pulse PWP will set a storage flip-flop $FF_4$ the output of which then enables an AND gate 64 and disables an AND gate 65 to allow the larger value SU which has meantime been stored in the shift register 61 to be routed through an OR gate 66 for comparison with the next phase correlation value. At the same time, that correlation value being shifted out of the shift register 61 is stored in the shift register 62.

If the next phase correlation value SU being compared is not larger, the flip-flop $FF_4$ will be reset by the next timing pulse PWP to inhibit the AND gate 64 and enable the AND gate 65. Thus, the flip-flop $FF_4$ is set true or false by each PWP pulse according to whether the flip-flop $FF_3$ is set true or false. At the time the flip-flop $FF_4$ is set, the flip-flop $FF_3$ is reset. To facilitate implementation, the flip-flop $FF_4$ is selected to be a D-type flip-flop, as shown, such that if a binary 1 is applied to the data input D, regardless of what state the flip-flop was in before, it will assume a state representing a binary 1 when the pulse PWP is applied. Similarly, if the D input is a binary 0 when the pulse PWP occurs, it will assume a state representing a binary 0.

The control logic for the flip-flop $FF_3$ is the same as for the flip-flop $FF_1$, but since it is desirable to have the output of a comparator 63 true if the current phase correlation value SU is greater than or equal to the value BIG stored in the shift register 62, the flip-flop $FF_3$ is set to the true state rather than reset to the false state by the pulse PWP at the start of each phase word period. In that manner, the value BIG stored in the shift register 62 must be greater than the value SU in order for it to prevail over the value SU stored in the shift register 61 during the next phase correlation comparison.

Although the comparator 63 operates through the entire time of steps 1 and 2, only the largest phase correlation value detected during the last (1,200th sample period of the second step is to be used. Therefore, operation of the comparator 63 during only this 1200th sample period is used. That is accomplished by allowing each sample period timing pulse SAP to set a flip-flop $FF_5$ through an AND gate 70 to clear the registers 62 during the first phase word period of a sample period. The next phase word period pulse to occur then resets the flip-flop $FF_5$ through and AND gate 71 to allow the register 62 to operate in the manner intended. The AND gate 70 is inhibited by a data subword timing pulse DWP, thereby inhibiting the register 62 from being cleared when step 3 is initiated.

Another flip-flop $FF_6$ is employed to clear the register 43 at the beginning of a sample period. This flip-flop is set by a data sub-word period pulse DWP through an AND gate 72, and thereafter reset by a sampling period pulse through an AND gate 73. While set, the flip-flop inhibits recirculation of the register 43 through an inhibit input terminal of an AND gate 74. However, during steps 3 and 6, the clearing of the register 43 is inhibited by control signals step 3 and step 6 applied to an inhibit input terminal of the AND gate 72 via an OR gate 75. The input to the adder-subtracter 42 from the analog-to-digital converter 41 is also inhibited by step 3 and step 6 control signals applied to an inhibit input terminal of an AND gate 76 via an OR gate 77. Thus the subcarrier and bit phase correlations merely recirculate during the respective steps 3 and 6. Since the signal DWP inhibits clearing the shift register 62, the largest phase correlation is retained in the register 62 during those steps.

Figures 14, 15:
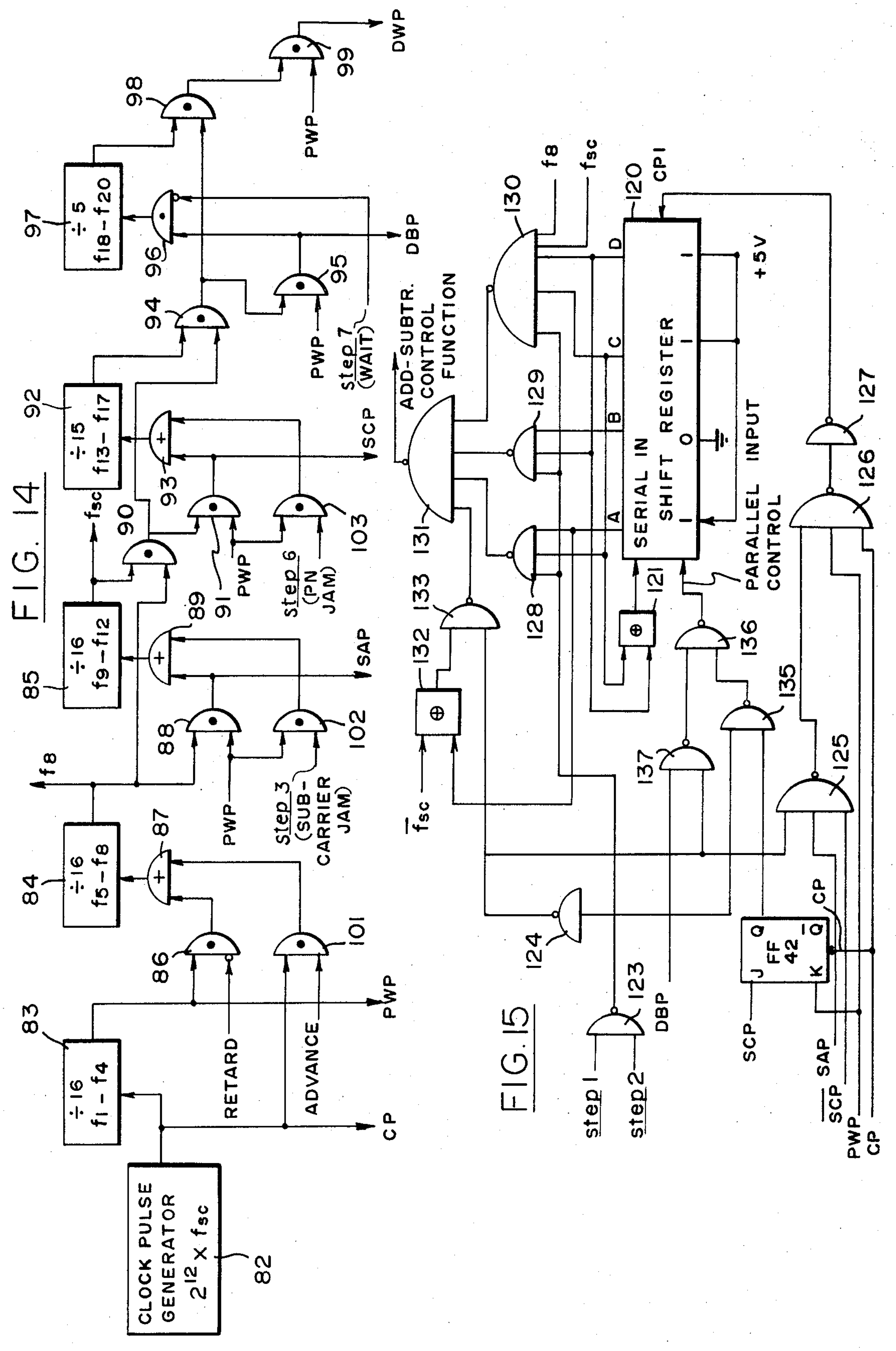
FIG. 14 is a logic diagram of a timing section for the apparatus of the present invention.
FIG. 15 is a logic diagram of a function generating section for the apparatus of the present invention.

The function generator 44 is synchronized by timing signals from a timing section 80 and step control signals from the sequence control section 57. The timing section 80 is shown in FIG. 14 to be described now, and the function generator 44 is shown in FIG. 15 to be described hereinafter. The timing section consists of a stable clock pulse generator 82 operating at a frequency of $2^{12}$ times the subcarrier frequency $f_{sc}$. Three 4-bit counters 83, 84 and 85 are connected in cascade to divide the basic clock rate, first by sixteen to generate phase-word period (PWP) pulses which are gated through an AND gate 86 and an OR gate 87 to divide again by sixteen in counter 84.

The output of the counter 84 is transmitted through an AND gate 88 under control of PWP pulses to generate sample period (SAP) pulses. Those pulses are transmitted through an OR gate 89 to the counter 85 which divides again by 16. The output of the counters 84 and 85 are applied directly to an AND gate 90, and the output of the AND gate 90 is applied to an AND gate 91 to transmit pulses to a counter 92 through an OR gate 93 in synchronism with PWP pulses.

The counter 92 divides the SCP pulses at the output of the AND gate 91 by 15. The output of the AND gate 90 is combined with the output of the counter 92 at an AND gate 94, and the result is combined with PWP pulses at an AND gate 95 to produce data bit period (DBP) pulses. The DBP pulses are then transmitted through an AND gate 96 to a counter 97 which divides by five to produce through AND gates 98 and 99 data subword period (DWP) pulses.

In summary, the counter 83 divides the clock pulses by 16 to define phase word periods during which the clock pulses CP from the generator are being applied to the serial adder-subtracter 42 for sixteen phase correlations during each phase word period. The counter 84 then divides by 16 to define 16 samples during each cycle of the subcarrier. The counter 85 divides by 16 to define subcarrier periods. Since there are 15 cycles of the subcarrier for each data bit, the counter 92 divides by 15 to define data bit periods. Since correlations is desired for 5-bit times during steps 1, 2 and 5, the data bit period pulses DBP are divided by five to define data sub-word periods. The data sub-word period pulses DWP are then employed in the control section 57 (FIG. 10) to time steps 1 and 2. The DWP pulses are also employed to time the wait period of 10-bit times in step 4.

It should be noted that the clock pulse is a sharp narrow pulse while the rest of the timing signals PWP, SAP, SCP, DBP and DWP are square pulses. The timing signal PWP is a square wave at one-sixteen the clock pulse rate and has a width equal to one serial bit time of a sample period. Since the remainder of the timing pulses SAP, SCP, DBP and DWP are formed by gating PWP pulses through AND gates, they also are equal in width to one serial bit time of a sample period.

Each of the counters is synchronous within itself, i.e., transitions which occur in any of the stages within the counter occurs synchronously with the input signal to the counter. Since the input to each counter (except the first) is gated by the PWP pulses, all are synchronous with the PWP pulses, and negligible delay is incurred throughout the entire chain in developing the various timing signals. Accordingly, each of the counters 83, 84 and 85 is a conventional 4-bit synchronous counter. The counter 92 is also a 4-bit synchronous counter but modified to reset to zero in response to the 15 pulse applied thereto, instead of the 16. The counter 97 is a 3-bit synchronous counter modified to reset in response to the fifth pulse applied thereto.

The AND gate 86 is provided with an inhibit input to receive a retard control signal while a gate 101 connected to the clock pulse generator 82 is provided with an input terminal to receive an advance control signal. Those two gates are employed to advance and retard the phase of the reference subcarrier for phase tracking in step 8. Although phase tracking is not per se a part of the present invention, it is important to note that it may be readily accomplished through the use of the some digital correlator used for achieving synchronization during the prefix period of a message transmission. In that regard it should also be noted that many messages may follow one prefix period; the phase tracking achieved through control of gates 86 and 101 will prevent the local (reference) PN code modulated subcarrier from drifting out of synchronization with the received PN code modulated subcarrier that is bi-phase modulated with binary digits of data. The remaining gates 102 and 103 are employed to set the phase of the reference subcarrier and the phase of the reference PN code, respectively.

Operation of the control section 57 of FIG. 10a which implements the flow diagram of FIG. 7 will now be described. When power is first turned on, flip-flop $FF_{11}$ through $FF_{19}$ will be randomly set true and false, but since the control is sequential, the system will progress until one of the flip-flops $FF_{12}$, $FF_{16}$ and $FF_{19}$ is set true. The control section will then recycle to set the flip-flop $FF_{11}$ true, which is the starting point for the flow diagram of FIG. 7.

To protect the control unit against the possibility of all flip-flops being set in the false state when power is first turned on, a large AND gate 110 having eight input terminals connected to the false output terminals of the flip-flops $FF_{12}$ to $FF_{19}$ detects that condition and sets the flip-flop $FF_{11}$ true. Once the flip-flop $FF_{11}$ is set true, correlation of 16 phases of the subcarrier is carried out for 5-bit times.

Once a correlation value SU exceeds the threshold value from the threshold generator 51 the threshold comparator 50 transmits a signal SUTH indicating that a phase correlation value is greater than the threshold value. That signal SUTH enables an AND gate **111*b* and an AND gate 112*a* to allow the next data sub-word period (DWP) pulse to reset the flip-flop $FF_{11}$ and set the flip-flop $FF_{12}$, thereby advancing control from step 1 to step 2**.

During step 2, phases of the subcarrier are again correlated for another 5-bit times. If a signal SUTH is again transmitted by the threshold comparator 50, an AND gate **113*a* is enabled and the next DWP pulse resets the flip-flop $FF_{12}$ and sets the flip-flop $FF_{13}$ to advance control to step 3. If a signal SUTH is not transmitted by the comparator 50 during step 2, an AND gate 111a is enabled through an OR gate 109 to cause the flip-flop $FF_{11}$ to be set while the flip-flop $FF_{12}$ is reset, thereby returning the control unit to step 1**.

Once the flip-flop $FF_{13}$ has been set, a step 3 signal is transmitted to the timing unit 80 to advance the phase of the subcarrier until a phase threshold value SU is equal to or greater than the largest threshold value (BIG) captured in the shift register 62. When that occurs, an AND gate **113*b* is enabled and the next phase word period (PWP) pulse resets the flip-flop $FF_{13}$ while an AND gate 114*b* is enabled for the flip-flop $FF_{14}$ to be set in response to the same PWP pulse, thereby advancing the control unit to step 4**.

Once the flip-flop $FF_{14}$ is set, an AND gate **115*a* is enabled to allow the next data sub-word period (DWP) pulse to set the flip-flop $FF_{15}$. After the flip-flop $FF_{15}$ has been set, the next DWP pulse resets the flip-flop $FF_{14}$ and $FF_{15}$ through AND gates 114*b* and 115*b*. At the same time, the flip-flop $FF_{16}$ is set by the same DWP pulse transmitted through an AND gate 116*a* to advance the control unit to step 5. Since the flip-flop $FF_{15}$ is being reset while the flip-flop $FF_{16}$ is being set, the flip-flop $FF_{16}$ will remain set only for 5-bit times because the next DWP pulse is then gated through an AND gate 116*b*** to the reset terminal of the flip-flop $FF_{16}$.

While the flip-flop $FF_{16}$ is set, correlation of fifteen phases of the PN code is carried out for 5-bit times. At the end of that period, the flip-flop $FF_{17}$ is set through an AND gate **117*a* if a signal SUTH is being transmitted. If not, the AND gate 111a is enabled through the OR gate 109 to cause the control unit to recycle to the first step by setting the flip-flop $FF_{11}$. If the flip-flop $FF_{17}$ is set, a step 6 signal is transmitted to the timing unit 80 to advance the phase of the PN modulated subcarrier until a PN phase correlation value SU is equal to or greater than the largest correlation value (BIG) captured in the register 62, at which time an AND gate 117*b*** is enabled to allow the next phase word period pulse PWP to reset the flip-flop $FF_{17}$.

At the same time the flip-flop $FF_{17}$ is being reset, the flip-flop $FF_{18}$ is set by the same PWP pulse through an AND gate 118 to advance the control unit to step 7. In step 7, the control unit causes the system to simply wait for the start of the next data bit period, at which time a DBP pulse resets the flip-flop $FF_{18}$ and sets the flip-flop $FF_{19}$ through an AND gate **119*a***.

The primary function of step 8 is the detection of data bits. A secondary function is phase tracking, and a third function is to monitor the presence of a communications signal by continually accumulating correlation values of five data bit periods and determining whether the sum of those five correlation values exceeds a threshold value T. If it does, the process of accumulating threshold values of five data bit periods is continued. If not, the AND gate **111*a* is enabled through the OR gate 109 to allow the flip-flop $FF_{11}$ to be set in response to the next data sub-word period pulse DWP to return the control unit to step 1. All functions operate on correlation values derived from the same digital correlator employed in the first seven steps, but in a slightly different manner in order to time share hardware used in steps 1 to 7**.

From the foregoing description of the operation of the control unit, it may be seen that its mechanization is a straight forward implementation of the flow diagram of FIG. 7. Most of the transitions occur in synchronism with the DWP pulses which mark data sub-word periods. The principal exceptions are transitions from step 3 to step 4 and step 6 to step 7 since those transitions occur only after subcarrier phase and data bit phase synchronization has been established.

Synchronization of the phase $0_0$ of the local subcarrier reference to the input subcarrier phase is accomplished by gating additional phase word period pulses PWP to the counter 85 through the AND gate 102 enabled by the step 3 signal generated by the flip-flop $FF_{13}$ in the timing unit 57. Each additional PWP pulse advances the phase of the reference by one sample period, i.e., by one-sixteenth of a subcarrier cycle. Since there are sixteen PWP pulses in one sample period, synchronization always takes place in less than one sample period. Once a sufficient number of PWP pulses have been gated into the counter 85 to advance the phase of the reference subcarrier the necessary increments of phase to produce synchronization with the signal subcarrier, a signal SUB is transmitted by the comparator 50 indicating that a current phase correlation value is greater than the largest (BIG) value captured in the shift register 62. The SUB signal will allow the control unit to advance to step 4, as noted hereinbefore.

The function of step 3 just outlined is carried out in the following manner. During the presence of a step 3 signal, the input to the adder-subtracter 42 from the analog-to-digital converter 40 is inhibited by a step 3 signal applied to the inhibit input terminal of the AND gate 76 through the OR gate 77 to cause the contents of the shift register 43 to merely recirculate. Meantime, clearing of the register 62 is inhibited by a DWP pulse at the inhibit input terminal of the AND gate 70. Consequently, the largest phase correlation value stored during step 2 is captured in the shift register 62 during step 3.

A comparison between the contents of a shift register 43 and the contents of a shift register 43 and the contents of the register 62 is made during step 3 exactly as it was during step 2. However, no correlation value in the register 43 can be greater than the correlation value in the register 62 and only one will be equal to it. Therefore, the SUB term will be true only at the end of that phase word period during which the largest correlation value recirculating in the register 43 appears at the input to the serial comparator comprising the flip-flop $FF_3$. If the first phase correlation value ($R_0$) is the largest, the term SUB will become true at the end of the first phase word period causing a transition from step 3 to step 4 without any PWP pulses being gated into the counter 85 of FIG. 14. If any other phase correlation value is the largest, such as the correlation value $R_3$ for the third phase word period, then the term SUB will become true at the end of the fourth phase word period, and three PWP pulses will be gated into the counter 85. In that manner the number of PWP pulses gated into the counter 85 is equal to one less than the number of phase word periods that the control unit 57 is in step 3.

Operation of the control unit 57 and the timing unit 80 is the same during step 6 as step 3, except that bit synchronization is accomplished by advancing the subcarrier counter 92 of FIG. 14 rather than the sample counter 85. As in step 3, the maximum duration of step 6 is one sample period. The step 6 control signal causes the AND gates 72 and 76 to be inhibited so that the contents of a shift register 43 will recirculate unaltered for comparison with the largest correlation value (BIG) then being stored in the shift register 42. When a phase correlation value SU stored in the register 62 is found to be larger, a signal SUB is transmitted to the AND gate 117*b* and 118 in order for the control unit to advance to step 7 in response to the next PWP pulse.

As noted hereinbefore data detection, in step 8 may be implemented with the same digital correlator as used for acquiring synchronization. The differences in the detail of implementation may be achieved through control gates responsive to a STEP 8 signal. Before describing in functional terms the technique of data detection, it would be helpful to review in general terms how the subcarrier and bit synchronization achieved in accordance with the present invention permits data detection. Referring to FIG. 11, the PN code sequence is 101111000100110, with each PN bit shown in the first waveform equal in duration to one subcarrier cycle. The exclusive-OR waveform of the subcarrier and PN code shown in the first two waveforms is then shown in the third waveform. A data waveform showing a sequence of 01 is then shown in the fourth waveform. The composite data communications signal formed as the exclusive-OR of the third and fourth waveforms is then shown in the fifth waveform. Since the exclusive-OR function of the third and fourth waveforms is a binary 1, data detection can be achieved by correlating the locally generated signal SC⊕PN with the received signal SC⊕PN⊕DATA once bit correlation has been achieved by synchronizing the locally generated signal SC⊕PN with the prefix of the received signal, which is a signal SC⊕PN.

During steps 1, 2 and 5, correlation is performed over a period of 1,200 samples covering five data bit periods. Since data detection requires that the system be able to distinguish between a binary one of a given phase and a binary zero of an opposite phase during each bit period, correlation is performed on 240 samples during each data bit period. During the first sample period of each data bit period, the register is cleared, just as at the beginning of steps 1, 2 and 5. Thereafter, only in-phase correlation is carried out. The in-phase correlation value $R_0$ of interest appears at the output shift register 43 during each phase-0 word period. The output of the analog-to-digital converter is only then gated, as is the output of the function generator 44, to the adder-subtracter. Otherwise, the digital correlator performs in exactly the same manner that it did in step 5 except that it is now operative only during each phase-0 word period. Other phase-1 to phase-14 word periods in the accumulator are not used. The add-subtract control signal from the function generator 44 is the same as described for the phase-0 word periods of step 5.

Phase tracking and monitoring of signal presence can be achieved with similar digital correlators controlled for independent operation while data is being detected. For monitoring of signal presence, 1,200 samples of the input signal are accumulated over successive 5-bit periods just as in step 5. However, the process must include an algorithm for removing modulation in order that an absolute value of correlation be obtained. If after a given 5-bit period a predetermined threshold has been achieved, the monitoring process starts over; otherwise it resets the system to step 1. Tracking is accomplished by accumulating samples at the points in tune where the transitions (axis crossing points) should occur over a data bit period, and incrementing the phase of the local reference in such a direction as to drive the value of the accumulator toward zero.

Referring now to FIG. 15, the function generator 44 of FIG. 10 is implemented with a 4-bit shift register 120 having: four parallel input terminals to stages A, B, C and D for periodically receiving the first four bits 1011 of the PN code; a serial input for receiving the exclusive-OR function ($C.\bar{D}+\bar{C}.D$) of stages C and D through a logic network 121, thereby producing the PN code sequence at the output of stage A; and parallel outputs from stages A, B, C and D to a logic network 122 for generating the add-subtract control signal for PN code correlation in step 5. The remaining components are employed to control the function generator.

The clock pulse input CPI to the shift register is controlled by NAND gates 123 to 127 according to the logic function (SAP+SCP+step 1+step 2). PWP.CP. The principal control term for the clock pulse input is PWP. The system clock pulses (CP) are ANDed to narrow the CPI pulses which are at the rate of the PWP pulses. The terms which are combined by gate 125 inhibit the transmission of CPI pulses at appropriate times. During steps 1 and 2, the step 1 and step 2 signals are ORed by NAND gates 123 and 124, and applied to the NAND gate 125 to force the output of that gate true at all times, thereby causing CPI pulses to be applied without interruption at the PWP pulse rate. As the content of the shift register recirculates through the exclusive-OR network 121, NAND gates 128 to 131 produce the add-subtract control function according to the logic function ($A.C+B.D+C.D.f_8.f_{sc}$), which is the desired correlation waveform representing in sequence 16 phase displaced versions of the subcarrier reference $f_{sc}$ locally generated. During other steps 3 to 8, the control function is according to the logic function $A \oplus f_{sc}$ implemented by an exclusive-OR logic network 132 and transmitted to the NAND gate 131 through a NAND gate 133 while neither step 1 nor step 2 is true.

It should be noted that the serial output of stage A itself is a replica of the PN code, as are the serial outputs of stages B, C and D. The output of stage A was selected for convenience in mechanizing the tracking function in step 8. The output of stage A is modulated by $\bar{f}_{sc}$ to form $A \oplus \bar{f}_{sc}$ because the PN code in the communications receiver signal is in the form of bi-phase modulated subcarrier. Thus, even during a given bit period of the PN code, as $\bar{f}_{sc}$ changes polarity, so does the add-subtract control function. Consequently, during the first half-cycle of the subcarrier, when the subcarrier is low (represents a binary 0), the polarity of the add-subtract function is inverted, and during the second half-cycle it is not.

It may be shown that the function A.C+B.D is quite similar to the add-subtract control function (commutator output) of FIG. 4. During sample periods 0 through 7, that function is identical. Adding the term $C.D.f_8.f_{sc}$ corrects the function during sample periods 8 through 15. The resulting waveform is identical to the desired "-commutator output" during steps 1 and 2, thereby effectively providing sixteen phase displaced subcarrier references for correlation in sequence. However, the process of generating the add-subtract control function in this manner must be restarted periodically be reentering the first four bits of the PN code in the shift register once every subcarrier cycle. That is accomplished by a J-K flip-flop $FF_{42}$ which is set by a clap pulse when the subcarrier period pulse (SCP) first become true and reset when the phase-word period pulse (PWP) is again true. The true output of the flip-flop $FF_{42}$ is transmitted through a control NAND gate 135 and a NAND gate 136 which performs an OR function.

During step 5, the add-subtract control function generated must also be periodically restarted, but then only every data bit period instead of every subcarrier period. That is accomplished by a data bit period pulse (DBP) transmitted through a control NAND gate 137. In addition to that parallel input control, there is a further control on the shift register to allow for only 15 samples instead of 16 samples during a phase-word period. That is accomplished by inhibiting the clock input to the shift register except during step 1 and step 2. When step 1 and step 2 are not true the NAND gate 125 is enabled to transmit a binary 0 to the AND gate 126, thereby inhibiting a clock pulse when the sample period pulse (SAP) is true and the subcarrier period pulse is not true.

Figures 10B, 16:
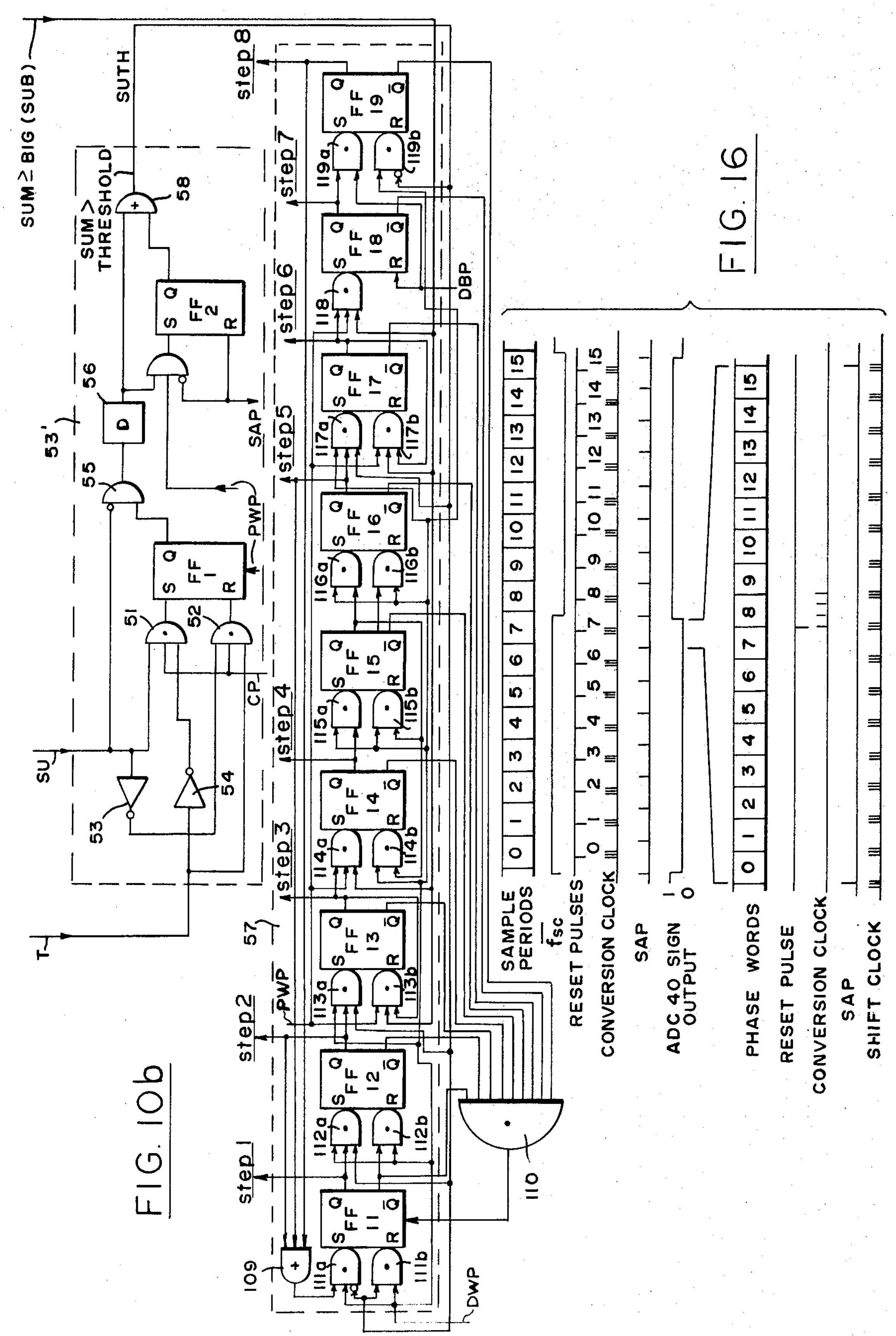

A timing diagram shown in FIG. 16 will summarize operation of the system starting with the 4-bit analog-to-digital converter 40. At least one conversion of the input signal sample to a binary number is made during each of 16 sampling periods (Nos. 0 to 15). A reset pulse is applied first under control of the timing section 80. Following each reset pulse, four conversion clock pulses are applied, one for each binary digit. Just before the next sample period, a sample period pulse (SAP) transfers the last value in the converter to the recirculating register 41. Assuming an inphase subcarrier receiver signal, the converter output will be like the subcarrier $0_0$ reference, but inverted because a positive value is represented by a low signal level (binary 0) while a negative value is represented by a high signal level (binary 1).

While only one group of four conversion clock pulses are applied during a given sample period, sixteen groups of four shift pulses are applied to the recirculating shift register to permit the binary number representing the level of sample to be correlated with sixteen phase displaced subcarrier references which the add-subtract control function represents, as shown for sample period No. 7. The conversion clock pulses are applied during the phase word period No. 8. The output of the counter 84 of the timing section 80 (FIG. 14) defines the sample periods by producing SAP pulses through AND gate 88, each SAP pulse of the width of a PWP pulse. The phase-word periods are defined directly by the counter 83. The subcarrier period is defined by the output of the counter 85 which is used to generate SCP pulses. For step 5, the counter 92 defines a data bit period by controlling the transmission of DBP pulses.

Although particular embodiments of the invention have been described and illustrated herein, it is recognized that modifications and variations may readily occur to those skilled in the art. For example, the sequence for achieving subcarrier and data bit synchronization may be expanded to provide for subcarrier synchronization followed by symbol synchronization and finally bit synchronization. The subcarrier synchronization would be achieved as before using 15 bit times of unmodulated subcarrier. Symbol synchronization would be achieved during the next 15 bit times using a first PN modulated subcarrier consisting of one PN code repetition per data bit period. Once that is achieved, bit synchronization may be achieved as before using a third portion of the prefix also 15 bit times long. The advantage of this modification is that at a data transmission rate of 4 bits per second, the frequency of the subcarrier may be 225 cycles per data bit for a subcarrier center frequency of 900 Hz, and still have only one PN code bit synchronization. Otherwise, with just 15 cycles per data bit as in the particular embodiments disclosed, the center frequency would be only 60 Hz for the same bit rate of data transmission. The higher center frequency is desired because interaction with a high-pass channel is less. Consequently, it is intended that the claims be interpreted to cover modifications and variations which may readily occur to those skilled in the art.

What is claimed is:

1. Apparatus for correlating a cyclic square-wave input signal with a replica of said input signal comprising timing means for producing synchronized periodic sample commands and clock pulses, converting means responsive to said sample commands for obtaining an arbitrary number of successive samples per cycle of said input signal and converting each sample to digital form, said digital form consisting of binary signals having two voltage levels representing binary values of plus one and minus one for the two levels of said input square-wave signal, means for generating said replica, said replica having two voltage levels corresponding to binary values of said input signal samples, said two voltage levels of said replica representing plus and minus signs corresponding to signs of said binary values of plus one and minus one of said input signal samples when converted to digital form, and means responsive to said clock pulses for accumulating in digital form a sequence of binary values of said input signal samples produced by said converting means over a number of cycles of said input signal to form a correlation value by arithmetically adding or subtracting the binary value of a given sample to the accumulation of binary values of previous samples under control of said replica according to whether said replica is at the time representing a plus or a minus sign, arithmetically adding when representing a plus sign and arithmetically subtracting when representing a negative sign, whereby after said number of cycles have been sampled, and the binary values thereof have been thus accumulated, said correlation value is proportional to the degree said replica is in phase with said input signal.

2. Apparatus for correlating a cyclic square-wave input signal with a plurality of phase-displaced versions of a replica of said input signal comprising timing means for producing synchronized periodic sample commands and clock pulses, converting means responsive to said sample commands for converting a number of successive samples per cycle of said input signal to digital form, said digital form consisting of binary signals having two voltage levels representing binary values of plus one and minus one for the two levels of said input square-wave signals, means for generating a plurality of phase displaced versions of said replica, each phase displaced version having two voltage levels corresponding to voltage levels of said input signal, said two voltage levels of each phase displaced version presenting plus and minus signs corresponding to signs of said binary values of plus one and minus one of said input signal samples converted to digital form, and means responsive to said clock pulses for accumulating in digital form a sequence of binary values of said input signal samples produced by said converting means over a number of cycles of said input signal to form a separate correlation value for each phase-displaced version of said replica by arithmetically adding or subtracting the binary value of a given sample to the accumulation of binary values of previous samples under control of separate phase displaced versions for each separate correlation value according to whether each separate phase displaced version is at the time representing a plus or a minus sign, by arithmetically adding when representing a plus sign and arithmetically subtract when representing a negative sign, whereby after said number of cycles have been sampled, and the binary values thereof have been thus accumulated, each correlation value is proportional to the degree that each of the separate phase displaced versions of said replica is in phase with said input signal.

3. Apparatus as defined in claim 2 wherein said accumulating means comprises a plurality of adder-subtracters, each connected to receive binary values from said converting means, and a plurality of registers, a given register connected to a given adder-subtracter for a given correlation value to be formed by accumulating said binary values, said given register being connected to receive the output of said given adder-subtracter, and to transmit to said given adder-subtracter the correlation value stored for addition or subtraction of a sample value received from said converting means under control of the sign of a given phase displaced version from said generating means.

4. Apparatus as defined in claim 2 wherein said accumulating means comprises a single adder-subtracter and a recirculating register of sufficient length to store in series said plurality of correlation values, said register being connected to receive the output of said single adder-subtracter, and to transmit to said adder-subtracter in sequence said correlation values for addition or subtraction of each binary value received from said converting means, each binary value being added or subtracted to each correlation value stored according to the sign of a different phase displaced version of said replica.

* * * * *